United States Patent
Beck et al.

(10) Patent No.: US 9,435,407 B2
(45) Date of Patent: Sep. 6, 2016

(54) TRANSMISSION

(71) Applicant: ZF Friedrichshafen AG, Friedrichshafen (DE)

(72) Inventors: Stefan Beck, Eriskirch (DE); Johannes Kaltenbach, Friedrichshafen (DE); Ulrich Kehr, Tettnang (DE); Michael Trubenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/549,646

(22) Filed: Nov. 21, 2014

(65) Prior Publication Data

US 2015/0167789 A1 Jun. 18, 2015

(30) Foreign Application Priority Data

Dec. 18, 2013 (DE) .................. 10 2013 226 479

(51) Int. Cl.
*F16H 3/44* (2006.01)
*F16H 3/66* (2006.01)

(52) U.S. Cl.
CPC .............. *F16H 3/666* (2013.01); *F16H 3/66* (2013.01); *F16H 2200/0039* (2013.01); *F16H 2200/201* (2013.01); *F16H 2200/2007* (2013.01); *F16H 2200/2038* (2013.01); *F16H 2200/2064* (2013.01); *F16H 2200/2094* (2013.01)

(58) Field of Classification Search
None
See application file for complete search history.

(56) References Cited

U.S. PATENT DOCUMENTS

| 4,497,219 | A | 2/1985 | Elsner |
| 5,358,458 | A | 10/1994 | Hicks |
| 5,823,910 | A | 10/1998 | Park |
| 7,377,874 | B2 | 5/2008 | Hayabuchi et al. |
| 8,435,147 | B2 * | 5/2013 | Kim ...................... B60K 6/365 475/280 |
| 8,454,473 | B2 | 6/2013 | Reitz |
| 8,491,438 | B2 | 7/2013 | Kim et al. |
| 8,897,946 | B2 * | 11/2014 | Kim ...................... B60W 20/10 180/65.265 |
| 2001/0012810 | A1 | 8/2001 | Ohkubo |

FOREIGN PATENT DOCUMENTS

| DE | 1 102 571 B | 3/1961 |
| DE | 31 34 259 A1 | 3/1983 |
| DE | 691 06 861 T2 | 6/1995 |
| DE | 696 09 294 T2 | 2/2001 |
| DE | 10 2005 058 226 A1 | 7/2006 |
| DE | 10 2010 024 147 A1 | 1/2011 |
| DE | 10 2010 061 054 A1 | 3/2012 |

OTHER PUBLICATIONS

German Search Report Corresponding to 10 2013 226 473.9 mailed Mar. 14, 2014.
German Search Report Corresponding to 10 2013 226 479.8 mailed Mar. 14, 2014.

* cited by examiner

*Primary Examiner* — Dirk Wright
(74) *Attorney, Agent, or Firm* — Davis & Bujold, PLLC; Michael J. Bujold

(57) ABSTRACT

A transmission having a drive input shaft (AN), a drive output shaft (AB), a housing (G), at least two planetary gearsets (PR1, PR2), and at least three shifting elements (A, B, C) whose selective engagement produces various transmission ratios between the drive input shaft (AN) and the drive output shaft (AB), so that at least three gears can be obtained. To obtain a gear in each case, two shifting elements are engaged and a further shifting element is disengaged.

13 Claims, 13 Drawing Sheets

| Gear | Shifting elements closed | | | Trans- mission ratio i | Gear interval φ |
|---|---|---|---|---|---|
| | Brake | Clutch | | | |
| | A | B | C | | |
| 1 | X | X | | 2,000 | |
| | | | | | 1,444 |
| 2 | X | | X | 1,385 | |
| | | | | | 1,385 |
| 3 | | X | X | 1,000 | |

Fig. 7

| Gear | Shifting elements closed | | | Trans-mission ratio i | Gear interval φ |
|---|---|---|---|---|---|
| | Brake | Clutch | | | |
| | A | C | B | | |
| 1 | X | | X | 2,000 | |
| 2 | X | X | | 1,410 | 1,418 |
| 3 | | X | X | 1,000 | 1,410 |

Fig. 14

| Gear | Shifting elements closed | | | Transmission ratio i | Gear interval φ |
|---|---|---|---|---|---|
| | Brake | Clutch | | | |
| | A | B | C | | |
| 1 | X | X | | 2,002 | |
| 2 | X | | X | 1,413 | 1,417 |
| 3 | | X | X | 1,000 | 1,413 |

TRANSMISSION

This application claims priority from German patent application serial no. 10 2013 226 479.8 filed Dec. 18, 2013.

FIELD OF THE INVENTION

The present invention concerns a transmission, in particular a three-gear transmission for a motor vehicle, preferably for use in a drive-train of electric vehicles or in a drive-train of hybrid vehicles. The present invention also concerns a method of operating such a transmission and a drive-train with such a transmission.

BACKGROUND OF THE INVENTION

Here, 'transmission' denotes a multi-gear transmission in which a predefined number of gears, i.e. fixed transmission ratios between the transmission input and the transmission output, can be engaged automatically by means of shifting elements. The shifting elements are for example clutches and/or brakes.

At present, as drive systems for electric vehicles one-gear transmissions are mainly used, i.e. simple step-down stages with an output rotational speed lower compared with the input rotational speed. With such a structure, however, the electric drive must cover the complete rotational speed range and this reduces its overall efficiency. Furthermore, the rotational speed range that can be realized is rather narrow.

It has therefore already been proposed to use two-gear transmissions as drive systems for electric vehicles. However, until now these have been designed as conventional manual-shift transmissions with sliding sleeves. If such a transmission is used, the electric machine can be made smaller, and this results in a clear cost advantage. However, precisely because the transmission is made with sliding sleeves, there is a traction force interruption during the shift. For automated drive-trains, however, such a traction force interruption results in a considerable impairment of comfort, which is undesired by the customer or the driver.

DE 10 2010 024 147 A1 discloses a two-gear transmission for transmitting drive torque in a drive-train of a vehicle, preferably for use in a drive-train of electric vehicles, in a drive-train of hybrid vehicles or in an auxiliary drive-train of hybrid vehicles, by virtue of which transmission, a gearshift can be carried out without traction force interruption or with less traction force interruption, by virtue of two automated and controllable clutches.

DE 10 2010 061 054 A1 discloses a drive-train of a hybrid vehicle, with which three or more fixed transmission ratio modes can be produced, this drive-train comprises a first and a second motor-generator, two individual planetary gearsets and four torque-transmitting elements.

SUMMARY OF THE INVENTION

The purpose of the present invention is to propose a transmission of the type mentioned at the beginning, which has small gear intervals within a large transmission spread and which, at the same time, is optimized in relation to the fitting space required and/or has high efficiency.

'Transmission spread' is understood to mean the quotient of the transmission ratio of the lowest gear and the transmission ratio of the highest gear, the lowest gear having the largest transmission ratio and the highest gear the lowest transmission ratio. If a transmission ratio i<1.0, the ratio is a step-up ratio, i.e. the rotational speed at the transmission output will be higher than the rotational speed at the transmission input.

According to the invention, the above objective is achieved with a transmission having the characteristics specified in description below.

In all five of the configurations proposed the transmission according to the invention comprises a drive input shaft, a drive output shaft, a housing, at least two planetary gearsets and at least three shifting elements, whose selective engagement produces various transmission ratios between the drive input shaft and the drive output shaft, in such manner that at least three gears can be implemented.

In the first configuration according to the invention it is provided that a ring gear of the first planetary gearset and the drive input shaft are connected in a rotationally fixed manner to one another, forming a first rotary shaft of the transmission. A carrier of the first planetary gearset and the drive output shaft are connected in a rotationally fixed manner to one another, forming a second rotary shaft of the transmission. A carrier of the second planetary gearset forms a third rotary shaft of the transmission. A ring gear of the second planetary gearset forms a fourth rotary shaft of the transmission. A sun gear of the first planetary gearset and a sun gear of the second planetary gearset are connected in a rotationally fixed manner to one another and form a fifth rotary shaft of the transmission.

With regard to the connection of the shifting elements to the various elements of the planetary gearsets of the transmission, in the first configuration it is proposed according to the invention that the first shifting element is arranged in the force flow between the third shaft and the housing of the transmission, and that the second shifting element is arranged in the force flow between the second shaft and the fourth shaft. According to the invention, the third shifting element is arranged in the force flow either between the third shaft and the fourth shaft, or between the fourth shaft and the fifth shaft, or between the third shaft and the fifth shaft. According to the invention, these different kinematic couplings of the shifting elements to the various shafts of the transmission thus produce an entire family of transmissions.

In the second configuration according to the invention it is proposed that a ring gear of the first planetary gearset and the drive input shaft are connected in a rotationally fixed manner to one another and form a first rotary shaft of the transmission. A carrier of the second planetary gearset and the drive output shaft are connected in a rotationally fixed manner to one another and form a second rotary shaft of the transmission. A sun gear of the first planetary gearset forms a third rotary shaft of the transmission. A carrier of the first planetary gearset and a ring gear of the second planetary gearset are connected in a rotationally fixed manner to one another and form a fourth rotary shaft of the transmission, and a sun gear of the second planetary gearset forms a fifth rotary shaft of the transmission.

With regard to the connection of the shifting elements to the various elements of the planetary gearsets of the transmission, in the second configuration it is proposed according to the invention that the first shifting element is arranged in the force flow between the third shaft and the housing of the transmission and that the second shifting element is arranged in the force flow between the third shaft and the fifth shaft. According to the invention, the third shifting element is arranged in the force flow either between the second shaft and the fifth shaft, or between the fourth shaft and the fifth shaft, or between the second shaft and the fourth shaft. By virtue of these different kinematic couplings of the shifting elements to the various shafts of the transmission, according to the invention an entire family of transmissions are thus produced.

In the third configuration, it is proposed according to the invention that the drive input shaft of the transmission forms a first rotary shaft of the transmission. A carrier of the second planetary gearset and the drive output shaft are connected in a rotationally fixed manner to one another and form a second rotary shaft of the transmission. A sun gear of the first planetary gearset and a sun gear of the second planetary gearset are connected in a rotationally fixed manner to one another and form a third rotary shaft of the transmission. A ring gear of the first planetary gearset forms a fourth rotary shaft of the transmission, and a carrier of the first planetary gearset and a ring gear of the second planetary gearset are connected in a rotationally fixed manner to one another and form a fifth rotary shaft of the transmission.

With regard to the connection of the shifting elements to the various elements of the planetary gearsets of the transmission, in the third configuration it is proposed according to the invention that the first shifting element is arranged in the force flow between the third shaft and the housing of the transmission, the second shifting element is arranged in the force flow between the first shaft and the fourth shaft, and the third shifting element is arranged in the force flow between the first shaft and the fifth shaft.

In the fourth configuration it is proposed according to the invention that a ring gear of the first planetary gearset and the drive input shaft are connected in a rotationally fixed manner to one another, forming a first rotary shaft of the transmission. A carrier of the second planetary gearset and the drive output shaft are connected in a rotationally fixed manner to one another and form a second rotary shaft of the transmission. A sun gear of the second planetary gearset forms a third rotary shaft of the transmission. A carrier of the first planetary gearset and a ring gear of the second planetary gearset are connected in a rotationally fixed manner to one another and form a fourth rotary shaft of the transmission. A sun gear of the first planetary gearset forms a fifth rotary shaft of the transmission.

With regard to the connection of the shifting elements to the various elements of the planetary gearsets, in this fourth configuration it is proposed according to the invention that the first shifting element is arranged in the force flow between the third shaft and the housing of the transmission, and that the second shifting element is arranged in the force flow between the third shaft and the fifth shaft. According to the invention, the third shifting element is arranged in the force flow either between the first shaft and the fifth shaft, or between the fourth shaft and the fifth shaft, or between the first shaft and the fourth shaft. According to the invention, these different kinematic couplings of the shifting elements to the various shafts of the transmission thus produce an entire family of transmissions.

In the fifth configuration, it is proposed according to the invention that a ring gear of the first planetary gearset and the drive input shaft are connected in a rotationally fixed manner to one another and form a first rotary shaft of the transmission. A carrier of the second planetary gearset and the drive output shaft are connected in a rotationally fixed manner to one another and form a second rotary shaft of the transmission. A sun gear of the first planetary gearset and a sun gear of the second planetary gearset are connected in a rotationally fixed manner to one another and form a third rotary shaft of the transmission. A ring gear of the second planetary gearset forms a fourth rotary shaft of the transmission and a carrier of the first planetary gearset forms a fifth rotary shaft of the transmission.

With regard to the connection of the shifting elements to the various elements of the planetary gearsets, in this fifth configuration it is proposed according to the invention that the first shifting element is arranged in the force flow between the third shaft and the housing of the transmission, the second shifting element is arranged in the force flow between the fourth shaft and the fifth shaft, and the third shifting element is arranged in the force flow between the first shaft and the fourth shaft.

Below, further characteristics of the present invention will be described, which apply in equal measure for all of the five configurations according to the invention.

The planetary gearsets are preferably in the form of so-termed minus planetary gearsets. A minus planetary gearset comprises a planetary carrier on which planetary gearwheels are mounted to rotate, a sun gear and a ring gear, wherein the teeth of at least one of the planetary gearwheels mesh both with the teeth of the sun gear and with the teeth of the ring gear, whereby the ring gear and the sun gear rotate in opposite rotational directions when the sun gear is rotating while the planetary carrier is fixed.

A plus planetary gearset differs from the minus planetary gearset described above, in that the plus planetary gearset has both inner and outer planetary gearwheels mounted to rotate on the planetary carrier. The teeth of the inner planetary gearwheels mesh on one side with the teeth of the sun gear and on the other side with the teeth of the outer planetary gearwheels. Moreover, the teeth of the outer planetary gearwheels mesh with the teeth of the ring gear. As a result, when the planetary carrier is fixed, the ring gear and the sun gear rotate in the same direction.

The structure of the two planetary gearsets according to the invention as minus planetary gearsets has been shown to be a particularly economical production option. At the same time this arrangement has high efficiency in relation to the gearset. Provided that connectability permits, as an alternative embodiment at least one minus planetary gearset can be changed to a plus planetary gearset. At the same time, however, this requires the planetary carrier and ring gear connections to be interchanged and the value of the fixed transmission ratio to be increased by 1. In this context the fixed transmission ratio is the transmission ratio between the sun gear and the ring gear when the planetary carrier is not moving.

The use of planetary gearsets makes it possible to produce particularly compact transmissions, which allows great freedom when arranging the transmission in a vehicle.

With regard to the spatial arrangement of the two planetary gearsets in the transmission, in an advantageous design it is proposed to arrange the two planetary gearsets coaxially with one another.

The geometrical position of the individual planetary gearsets and shifting elements can be chosen freely provided that it allows the connectability of the elements. This means that the position of individual elements in the housing can be changed as desired, provided that the individual connecting elements or shafts do not cross. This also includes the possibility that planetary gearsets can be arranged radially over one another or even axially one behind another for example along the drive input shaft. In this context 'connectability' is understood to mean that with a different geometrical position, i.e. with a component arrangement different from the one just described, the same connections or interconnections of the interfaces are ensured without any crossing of individual connecting elements or shafts.

The shifting elements of the transmission according to the invention can in each case be in the form of frictional shifting elements, i.e. friction clutches or friction brakes, for example disk clutches, disk brakes or band brakes, or in the form of interlocking shifting elements, i.e. interlocking clutches or interlocking brakes such as unsynchronized or synchronized claw clutches or claw brakes, or cone clutches or cone brakes.

Furthermore, the shifting elements are preferably arranged so as to be easily accessed from outside. Easily accessed from outside means, in the context of shifting elements, that no further components are arranged between the housing and the shifting element, or that the shifting elements are preferably arranged on the drive input shaft or the drive output shaft.

Clutches are shifting elements which, depending on their actuation state, allow a relative movement between at least two components or alternatively produce a rotationally fixed connection between them for the transfer of a load or a torque. A relative movement is understood to mean for example a rotation of at least two components of the clutch such that the rotational speed of the first component and that of the second component are different, i.e. a rotational speed difference exists. Moreover, the rotation of only one of the components is conceivable, while the other component is static or rotating in the opposite direction.

In what follows, a non-actuated clutch is understood to be an open clutch. This means that a relative movement between the two components is possible. When the clutch is actuated or closed, the two components will correspondingly rotate at the same speed and in the same direction.

A brake is understood to be a shifting element connected on one side to a fixed element, for example a housing, and on another side to an element that can rotate. In what follows, a non-actuated brake is understood to be an open brake. This means that the rotating component can rotate freely, i.e. the brake preferably has no influence on the rotational speed of the rotating component. When the brake is actuated or closed, the rotational speed of the rotating component is reduced to zero, i.e. a connection can be formed between the rotating element and the fixed element.

Basically shifting elements can also be used, which are closed in the non-actuated state and open when actuated. Correspondingly, the association between the function and the actuation state of the actuation states described above is to be understood the other way round. In the example embodiments that follow, an arrangement is first assumed in which an actuated shifting element is closed and a non-actuated shifting element is open.

The shifting elements can for example be designed to be actuated hydraulically, pneumatically or electro-mechanically.

Preferably the first shifting element is in the form of a first brake, the second shifting element in the form of a first clutch and the third shifting element in the form of a second clutch.

In particular, by means of the transmission according to the invention three gears can be obtained, wherein the first gear is obtained by closing the first and second shifting elements, the second gear by closing the first and third shifting elements and the third gear by closing the second and third shifting elements. Thus, in any one gear only one of the shifting elements is in its non-actuated, or open condition.

Thus, to produce a gear in each case two shifting elements are closed and the further shifting element is open, so that a gearshift to an adjacent higher gear or to an adjacent lower gear is in each case carried out by closing the shifting element that was previously open and by opening one of the previously closed shifting elements.

Depending on the rotation direction of the drive input shaft of the transmission, the first, second and third gears of the transmission can be obtained as forward gears or as reversing gears. Thus, the gears of the transmission can be used as forward gears with a first rotation direction of the drive input shaft, whereas when the drive input shaft rotates in a second direction opposite to the first rotation direction, the gears of the transmission can be obtained as reverse gears. For the forward gears and the reverse gears the shifting elements and the shifting condition of the shifting elements are identical. In this way no separate transmission components are needed for the reverse gears.

In a particularly advantageous embodiment all the shifting elements of the transmission according to the invention are in the form of frictional shifting elements. This structure of all the shifting elements as friction shifting elements enables the transmission according to the invention to have full powershifting ability, where this is understood to mean that at least the sequential gear changes can be carried out as powershifts, and this indeed, both as upshifts and downshifts and both during traction and during overdrive operation.

In a further, particularly advantageous embodiment of the transmission, the first and second shifting elements are interlocking and only the third shifting element is frictional. In this way, compared with the version in which all the shifting elements are frictional, the structural complexity of the shifting elements is reduced. The frictional shifting element is in this case preferably the one that has to be closed for a gearshift from the first to the second gear, or opened for a gearshift from the second to the first gear, whereby a traction upshift can be carried out with powershift from the first to the second gear or a traction downshift from the second to the first gear.

If only the third shifting element is frictional, it is advantageous to design the second gear and the third gear of the transmission as the main driving gears, since in the second and third gears the frictional shifting element is closed and therefore gives rise to no drag losses, so that the efficiency is improved.

In a further version of the invention the transmission ratios of the first and second gears can be chosen such that they cover the complete speed range of the vehicle. The third gear is then designed to be a so-termed coasting or overdrive gear, whereby at higher speeds in the third gear the rotational speeds are lower. A traction upshift from the first to the second gear or a traction downshift from the second to the first gear can then be carried out in the working performance range as a powershift.

In a further development, a freewheel can be arranged between at least one shaft of the transmission and the housing of the transmission, or between at least one shaft of the transmission and another shaft of the transmission.

In a preferred embodiment a planetary gearset can be connected upstream from the transmission according to the invention, which comprises at least a sun gear, a planetary gearwheel, a planetary carrier and a ring gear. Preferably, the upstream planetary gearset is designed as a minus planetary gearset. The sun gear of this planetary gearset then forms a sixth shaft of the transmission, which is or can be connected in a rotationally fixed or rotationally elastic manner to a drive output shaft of a drive aggregate. The ring gear is preferably formed as a rotationally fixed element and can for example be connected in a rotationally fixed manner to the housing of the transmission or made integrally with it. The carrier of the upstream planetary gearset is preferably connected to the first shaft of the downstream transmission. By virtue of the upstream planetary gearset the drive torque of the drive aggregate can be correspondingly increased. In a different embodiment the upstream planetary gearset can also be made as a plus planetary gearset.

In an advantageous further development the transmission according to the invention can be the main transmission of a group transmission in which the main transmission is associated with at least one further upstream and/or downstream transmission ratio step. A transmission ratio step in drive connection downstream from the main transmission can preferably be designed as a range group, whereas a transmission ratio step in drive connection upstream from the main transmission can preferably be designed as a splitter group. By means of a two-step splitter group, which can also be called the upstream group, the transmission ratio intervals between the gear steps of the main transmission can be approximately halved and thereby the total number of gears available can be doubled. By means of a two-step range group, which can also be called the downstream group, the spread of the transmission as a whole is substantially increased and the total number of gears available can again be doubled. The upstream or downstream transmission ratio steps can for example be in the form of a spur gear pair or a planetary gearset.

The drive input shaft and the drive output shaft of the transmission and the transmission input and transmission output are preferably arranged coaxially with one another. However, the drive input shaft and the drive output shaft of the transmission and the transmission input and transmission output can also be designed such that they are arranged axis-parallel or at an inclination to one another. It is also possible for the transmission input and transmission output to be arranged on opposite sides of the transmission housing or on the same side thereof. This allows the transmission to be adapted for various fitting situations.

According to a further aspect of the present invention, an axle differential, a transfer box and/or a clutch can be arranged on the drive input side or on the drive output side of the transmission.

In a further embodiment of the invention, an auxiliary power take-off can be provided on any shaft of the transmission for driving additional aggregates, preferably on the drive input shaft or on the drive output shaft.

A further advantage of the transmission proposed here is that in principle, an additional electric machine or some other force/power source can be arranged on any shaft of the transmission. This additional electric machine or other force/power source can be used, for example, for synchronizing elements of the transmission.

The method according to the invention for operating a transmission according to the invention as described above provides that to obtain the three gears of the transmission, in each gear two respective shifting elements are closed and the further shifting element is open. Regardless of whether the shifting elements are actuated hydraulically, pneumatically, electro-mechanically or in some other way, this results in low energy uptake of the shifting elements which ultimately has an advantageous effect on the consumption for example of fuel by an internal combustion engine as the source of drive power for the vehicle. A gearshift to an adjacent higher gear or to an adjacent lower gear is in each case carried out by closing the one, previously open shifting element and opening one of the two previously closed shifting elements.

In a preferred version of the method according to the invention, at least a traction upshift from the first to the second gear and a traction downshift from the second to the first gear are carried out as powershifts. In the traction upshift from the first to the second gear a load transfer can take place by a frictional shifting element to be closed during the gearshift in such manner that an interlocking shifting element which is to be opened during the gearshift can be disengaged while free from load. In the traction downshift from the second to the first gear a load can be maintained by a frictional shifting element to be opened during the gearshift in such manner that an interlocking shifting element to be closed during the gearshift can be engaged while free from load.

In a further version of the method according to the invention, an overdrive downshift from the third to the second gear is carried out as a traction force interrupting shift if a driver's demand changes from traction operation to overdrive operation.

Besides a transmission according to the invention as described earlier, the drive-train according to the invention comprises at least a drive aggregate wherein the drive input shaft of the transmission is or can be connected in a rotationally fixed or rotationally elastic manner with a drive output shaft of the drive aggregate.

In a particularly preferred embodiment the drive aggregate is in the form of an electric machine which can be operated both as a motor and as a generator. In this preferred embodiment, depending on the rotation direction of the electric machine or the rotation direction of the drive input shaft of the transmission, the first, second and third gears of the transmission according to the invention can be obtained as forward gears or as reverse gears. Thus, when the electric machine is rotating in a first direction the gears of the transmission can be used as forward gears, whereas if the electric machine is switched so as to rotate in a second direction opposite to the first rotation direction, the gears of the transmission are used as reverse gears. The shifting elements and their shifting conditions for the forward gears and for the reverse gears are identical. Accordingly, no separate transmission components for the reverse gears are needed. This drive-train is particularly suitable for an electric vehicle in which the electric machine can be connected by way of the transmission to drive wheels of the electric vehicle. Between the transmission and the drive wheels of the motor vehicle, for example a differential transmission such as an axle transmission can be arranged.

In a further preferred embodiment the drive-train is designed as a hybrid drive-train and comprises an internal combustion engine in addition to the above-mentioned electric machine. This drive-train is particularly suitable for a hybrid vehicle in which both the internal combustion engine and the electric machine can be connected by way of the transmission to the drive wheels of the hybrid vehicle. Between the internal combustion engine and the transmission, in a conventional manner a controllable friction clutch can be arranged, by means of which the driveshaft of the internal combustion engine can be connected to the drive input shaft of the transmission. The friction clutch can be used as a separator and starting clutch and also as synchronization means during gearshift processes. Alternatively, a hydrodynamic torque converter can be arranged between the internal combustion engine and the drive input shaft of the transmission as the starting element. Furthermore, here too for example a differential transmission such as an axle transmission can be arranged between the transmission and the drive wheels of the motor vehicle.

BRIEF DESCRIPTION OF THE DRAWINGS

Below, examples of the invention will be explained in greater detail with reference to the attached figures, which show:

FIG. 7: An example shifting scheme for the transmission according to FIG. 1;

FIG. 14: An example shifting scheme for the transmission according to FIG. 8;

DETAILED DESCRIPTION OF THE PREFERRED EMBODIMENTS

Figure 1:
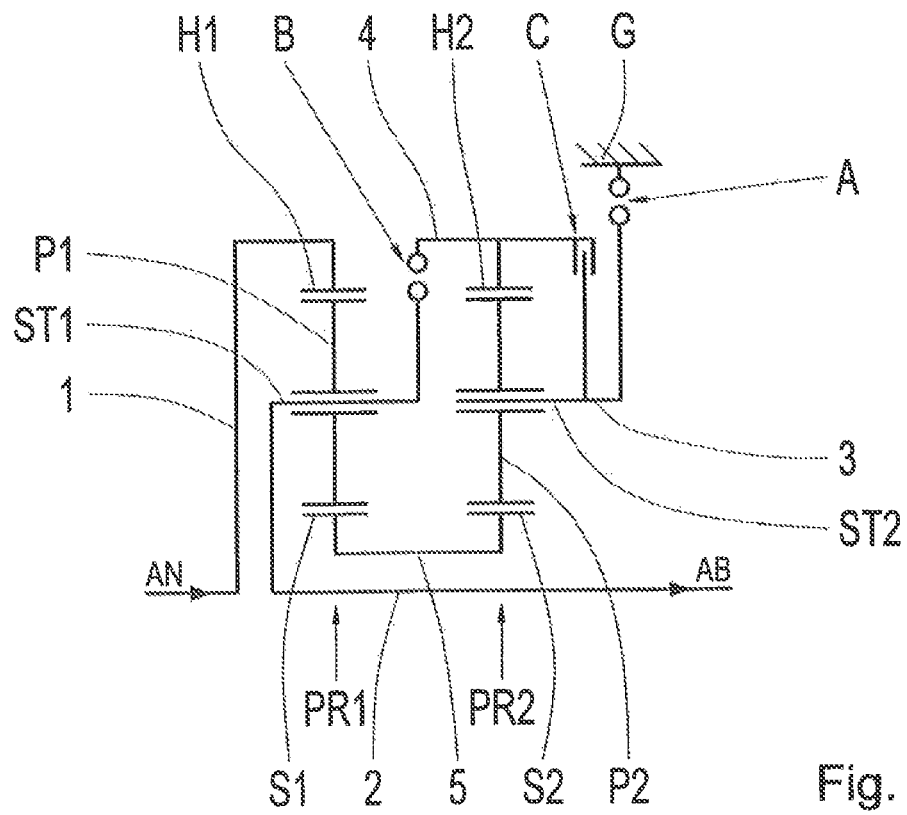
FIG. 1: A schematic view of a first embodiment of a transmission according to the first configuration of the invention.

FIG. 1 shows a schematic representation of a first embodiment of the transmission according to the invention, according to the first configuration of the invention. The transmission comprises a drive input shaft AN, a drive output shaft AB, a first planetary gearset PR1, a second planetary gearset PR2 and three shifting elements A, B, C, all of them accommodated in a housing G. In this example embodiment the two planetary gearsets PR1, PR2 are designed as simple minus planetary gearsets. The ring gears of the two planetary gearsets PR1, PR2 are indexed H1 and H2, their sun gears S1 and S2, their planetary gearwheels P1 and P2 and the carriers on which the planetary gearwheels P1, P2 are mounted to rotate are indexed ST1 and ST2. The transmission has five rotary shafts, indexed 1 to 5.

With regard to the coupling of the individual elements of the two planetary gearsets PR1, PR2 with one another and to the drive input shaft AN and the drive output shaft AB, in the transmission according to the first configuration of the invention the following provisions are made: the ring gear H1 of the first planetary gearset PR1 and the drive input shaft AN are connected to one another in a rotationally fixed manner and form the first rotary shaft 1 of the transmission. The carrier ST1 of the first planetary gearset PR1 and the drive output shaft AB are connected in a rotationally fixed manner to one another and form the second rotary shaft 2 of the transmission. The carrier ST2 of the second planetary gearset PR2 forms the third rotary shaft 3 of the transmission. The ring gear H2 of the second planetary gearset PR2 forms the fourth rotary shaft 4 of the transmission. The sun gear S1 of the first planetary gearset PR1 and the sun gear S2 of the second planetary gearset PR2 are connected in a rotationally fixed manner to one another and form the fifth rotary shaft 5 of the transmission.

With regard to the coupling of the three shifting elements A, B, C to the shafts 1 to 5 of the transmission described above, the following provisions are made in the transmission according to FIG. 1: the shifting element A is arranged in the force flow between the third shaft 3 and the housing G of the transmission, the shifting element B is arranged in the force flow between the second shaft 2 and the fourth shaft 4, and the shifting element C is arranged in the force flow between the third shaft 3 and the fourth shaft 4.

In the example embodiment shown in FIG. 1, the two planetary gearsets PR1, PR2 are arranged coaxially one behind the other, such that the first planetary gearset PR1 is the gearset of the transmission which is nearest to the drive input side and the second planetary gearset PR2 is the gearset of the transmission which is nearest to the drive output side. The drive input shaft AN and the drive output shaft AB of the transmission, as well as the transmission drive input and the transmission drive output are positioned on opposite sides of the transmission. The geometrical positions of the two planetary gearsets PR1, PR2 and the spatial arrangement of the shifting elements A, B, C, however, can be freely chosen provided that they permit the connectability of the elements.

Figure 2:
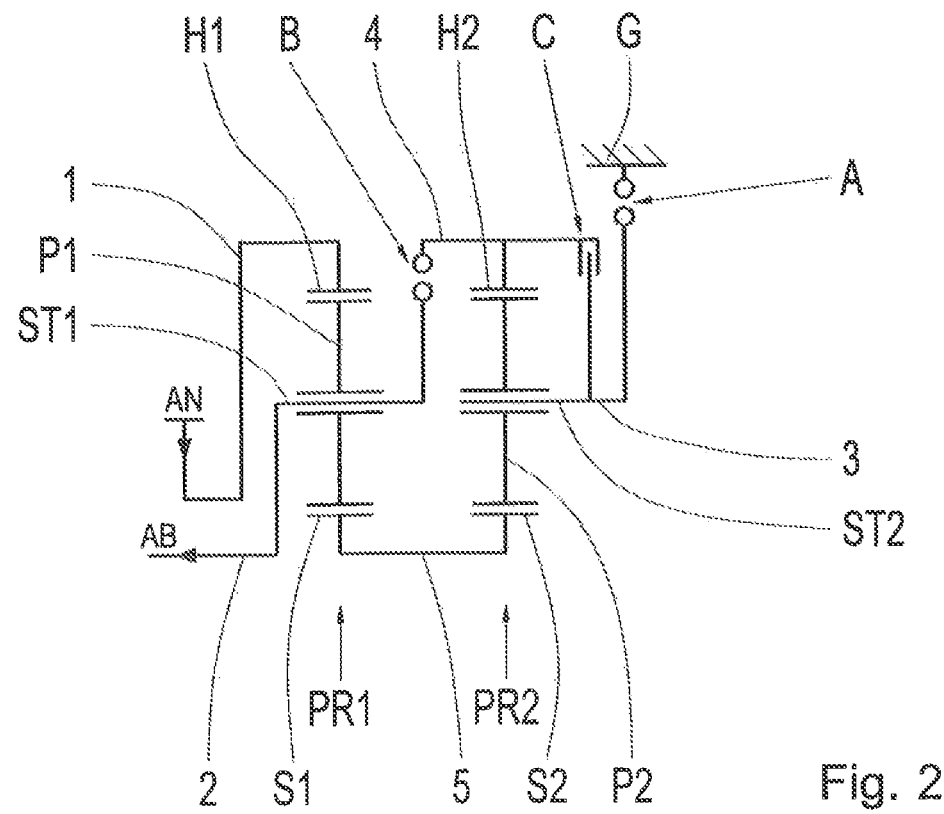
FIG. 2: A schematic view of a second embodiment of the transmission according to FIG. 1.
Figure 3:
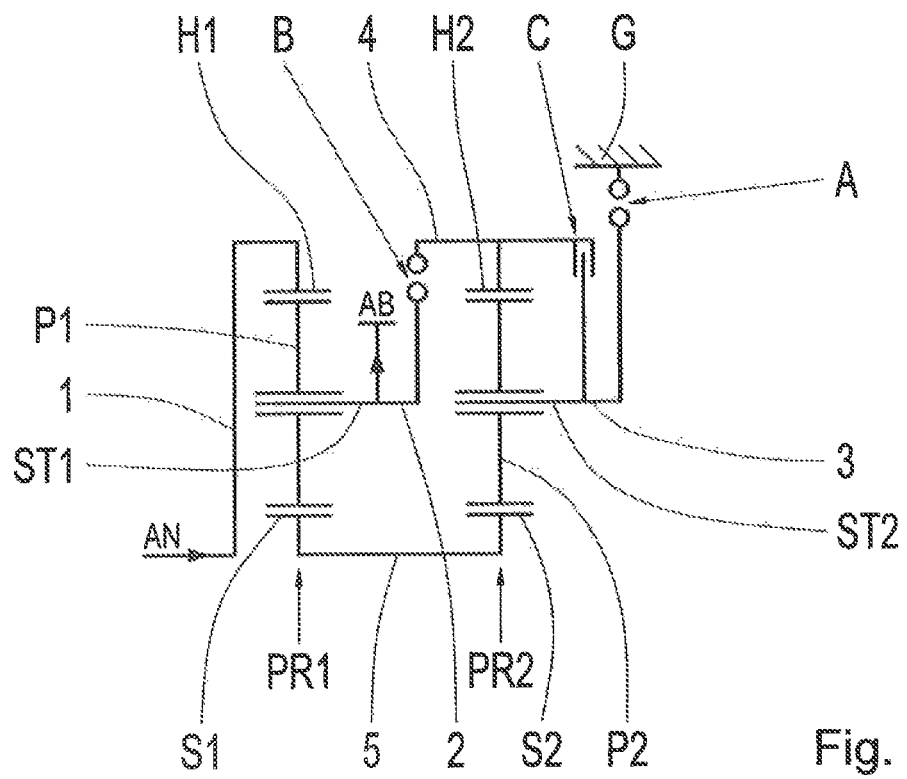
FIG. 3: A schematic view of a third embodiment of the transmission according to FIG. 1.

FIGS. 2 and 3 each show respective further design forms of the transmission described in FIG. 1, wherein only the differences from the embodiment shown in FIG. 1 will be described. In contrast to the embodiment of FIG. 1, in the embodiment of the transmission according to the invention shown in FIG. 2 the transmission input and the transmission output are arranged on the same side of the transmission housing and at an angle to one another, whereas in the embodiment of the transmission according to the invention shown in FIG. 3, as viewed spatially the transmission output is arranged in an area between the first and the second planetary gearsets PR1, PR2 and at an angle to the transmission input.

Figure 4:
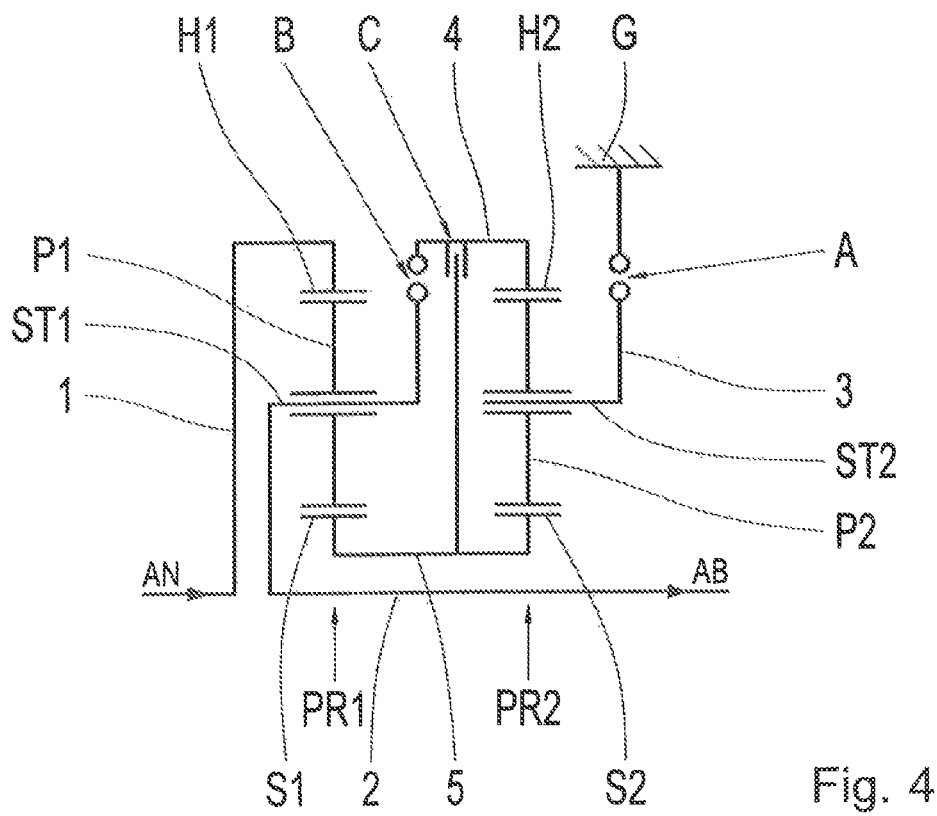
FIG. 4: A schematic view of a fourth embodiment of the transmission according to FIG. 1.

Starting from the consideration that in its actuated or closed condition the shifting element C locks the second planetary gearset PR2, in the following two example embodiments of a transmission according to the invention, two other possibilities are indicated for locking the second planetary gearset PR2 by means of the shifting element C. FIG. 4 shows a fourth example embodiment and FIG. 5 a fifth example embodiment, again represented in a simplified schematic manner, both based on the first example embodiment explained earlier in detail with reference to FIG. 1.

The transmission layout represented schematically in FIG. 4 differs from that represented in FIG. 1 mainly in that the shifting element C is now arranged in the force flow between the fourth shaft 4 and the fifth shaft 5. Therefore, in the engaged or closed condition the shifting element C now connects the sun gear S2 and the ring gear H2 of the second planetary gearset P2 to one another. A further difference from the transmission according to FIG. 1 consists in the spatial arrangement of the shifting element C. In the transmission according to FIG. 4, as viewed spatially the shifting element C is arranged in an area axially between the first planetary gearset PR1 and the second planetary gearset PR2, in this case axially immediately adjacent to the second planetary gearset PR2.

Figure 5:
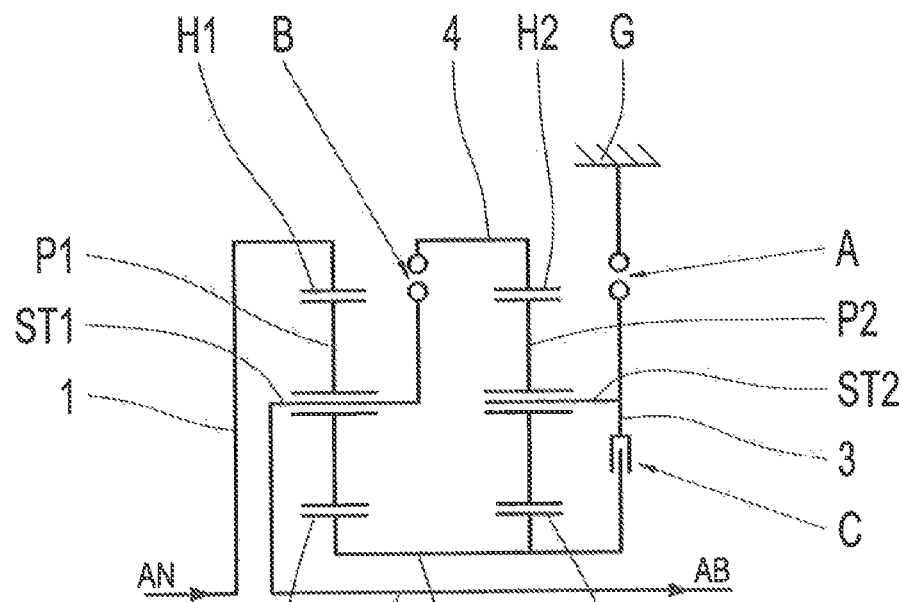
FIG. 5: A schematic view of a fifth embodiment of the transmission according to FIG. 1.

The transmission layout represented schematically in FIG. 5 differs from the transmission shown in FIG. 1 mainly in that the shifting element C is now arranged in the force flow between the third shaft 3 and the fifth shaft 5. Thus, in the engaged or closed condition the shifting element C now connects the sun gear S2 and the carrier ST2 of the second planetary gearset PR2 to one another. A further difference from the transmission according to FIG. 1 consists in the spatial arrangement of the shifting element C. In the transmission of FIG. 5, as viewed spatially the shifting element C is arranged in an area radially between the sun gear S2 and the carrier ST2 of the second planetary gearset PR2, in this case axially immediately adjacent to the second planetary gearset PR2.

Thus, depending on the possible arrangements of the shifting element C described above, the second planetary gearset PR2 can be locked in three different but functionally equivalent ways.

Figure 6:
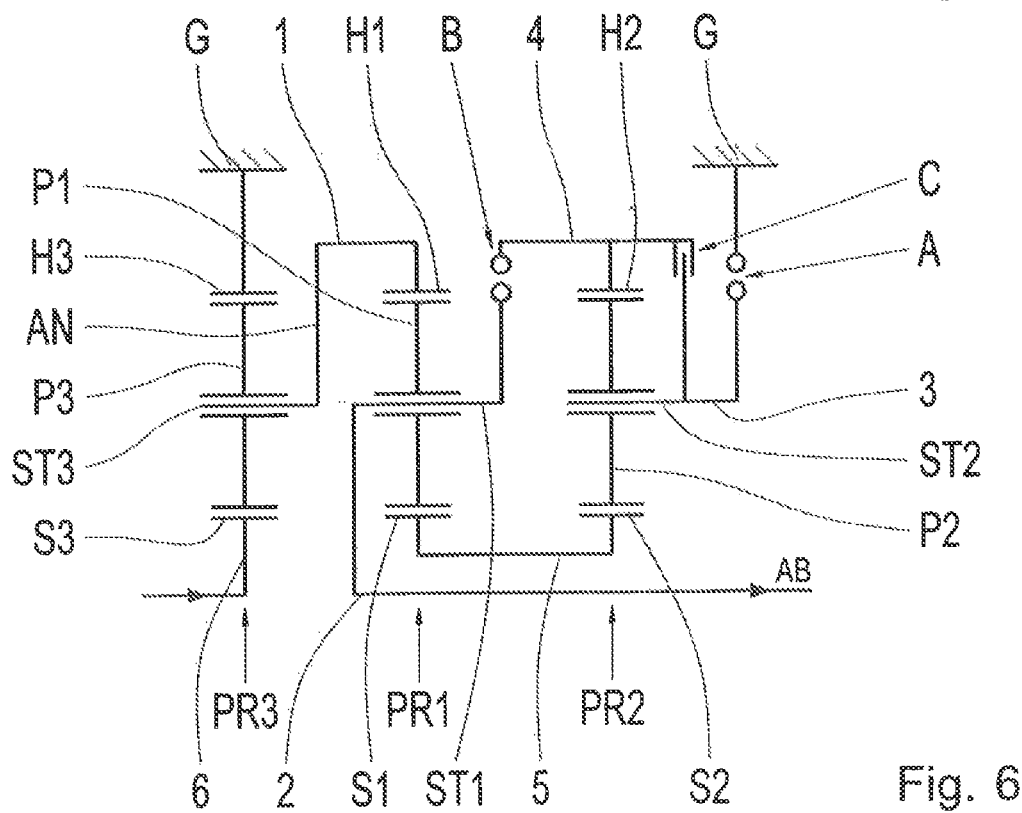
FIG. 6: A schematic view of a further embodiment of the transmission according to FIG. 1.

The transmission represented schematically in FIG. 6 differs from the transmission shown in FIG. 1 in that a planetary gearset PR3 is connected upstream from the transmission. The planetary gearset PR3 comprises a sun gear 33, a planetary gearwheel P3 and a ring gear H3. The sun gear 33 forms a sixth shaft 6, which is or can be connected in a rotationally fixed or rotationally elastic manner to a drive output shaft of a drive aggregate (not shown here) such as an electric machine. The ring gear H3 forms a rotationally fixed element and is in this case connected in a rotationally fixed manner to the housing G of the transmission. A carrier ST3 of the planetary gearset PR3 is connected in a rotationally fixed manner to the drive input shaft AN of the downstream transmission and thus also to the ring gear H1 of the first planetary gearset PR1. By virtue of the upstream planetary gearset PR3, in this case designed as a minus planetary gearset, the drive torque of the drive aggregate can be increased.

FIG. 7 shows in the form of a table an example shifting scheme of the transmission according to the invention illustrated in FIGS. 1 to 6. The presence of X in any field indicates which of the shifting elements A, B, C is/are closed in order to produce the individual gears. The first gear can be obtained by closing the shifting elements A and B. The second gear can be obtained by closing the shifting elements A and C. The third gear can be obtained by closing the shifting elements B and C.

In addition the table shows as examples the transmissions of the respective gears, the first gear having a transmission ratio of i=2.0, the second gear a transmission ratio of i=1.385 and the third gear a transmission ratio of i=1.0 Thus, the third gear can be designed as a so-termed direct gear. In the above, 'transmission' and 'transmission ratio' have the same meaning.

Furthermore, the table in FIG. 7 also shows the corresponding gear intervals of the gears. A gear interval is understood to mean the quotient between the transmission of a gear and that of a next-higher gear. In this case the gear interval from the first gear to the second gear has a value of φ=1.444 and the gear interval from the second to the third gear has a value of φ=1.385.

Figure 8:
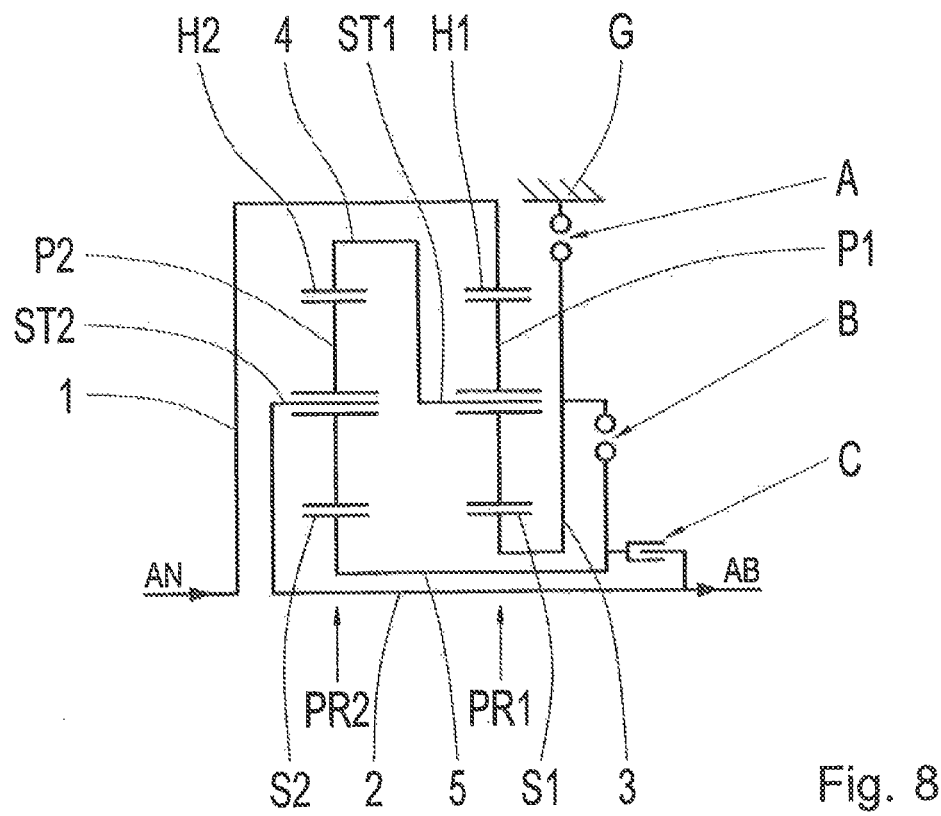
FIG. 8: A schematic view of a first embodiment of a transmission according to the second configuration of the invention.

FIG. 8 now shows a schematic representation of a first embodiment of the transmission according to the invention, according to the second configuration of the invention. Again, the transmission comprises a drive input shaft AN, a drive output shaft AB, a first planetary gearset PR1, a second planetary gearset PR2 and three shifting elements A, B, C, all accommodated in a housing G of the transmission. In this example embodiment as well the two planetary gearsets PR1, PR2 are in the form of simple minus planetary gearsets. The ring gears of the two planetary gearsets PR1, PR2 are indexed H1 and H2, their sun gears S1 and S2, their planetary gearwheels P1 and P2 and the carriers, on which the planetary gearwheels P1, P2 are mounted to rotate, are indexed ST1 and ST2 respectively. The transmission has five rotary shafts, indexed 1 to 5.

With regard to the coupling of the individual elements of the two planetary gearsets PR1, PR2 with one another and to the drive input and drive output shafts AN, AB, in this transmission according to the second configuration of the invention the following provisions are made: the ring gear H1 of the first planetary gearset PR1 and the drive input shaft AN are connected to one another in a rotationally fixed manner and form the first rotary shaft 1 of the transmission. The carrier ST2 of the second planetary gearset PR2 and the drive output shaft AB are connected to one another in a rotationally fixed manner and form the second rotary shaft 2 of the transmission. The sun gear S1 of the first planetary gearset PR1 forms the third rotary shaft 3 of the transmission. The carrier ST1 of the first planetary gearset PR1 and a ring gear of the second planetary gearset PR2 are connected to one another in a rotationally fixed manner and form the fourth rotary shaft 4 of the transmission, and a sun gear 82 of the second planetary gearset PR2 forms the fifth rotary shaft 5 of the transmission.

With regard to the coupling of the three shifting elements A, B, C to the shafts 1 to 5 so described, in the transmission according to FIG. 8 the following provisions are made: the shifting element A is arranged in the force flow between the third shaft 3 and the housing G of the transmission, the shifting element B is arranged in the force flow between the third shaft 3 and the fifth shaft 5, and the shifting element C is arranged in the force flow between the second shaft 2 and the fifth shaft 5.

In the example embodiment represented in FIG. 8, the two planetary gearsets PR1, PR2 are arranged coaxially one behind the other, the first planetary gearset PR1 being the gearset nearest to the drive output of the transmission and the second planetary gearset PR2 being the gearset nearest to the drive input of the transmission. The drive input shaft AN and the drive output shaft AB, as well as the transmission input and the transmission output, are also arranged coaxially with one another, while the drive input shaft AN extends fully over the second planetary gearset PR2 in the axial and radial directions. The transmission input and transmission output are on opposite sides of the transmission. According to FIG. 8 all three shifting elements A, B, C, as viewed axially, are arranged on the side of the first planetary gearset PR1 facing away from the second planetary gearset PR2. The geometrical position of the two planetary gearsets PR1, PR2 and the spatial arrangement of the shifting elements A, B, C, however, can be chosen freely provided that they permit the connectability of the elements.

Figure 9:
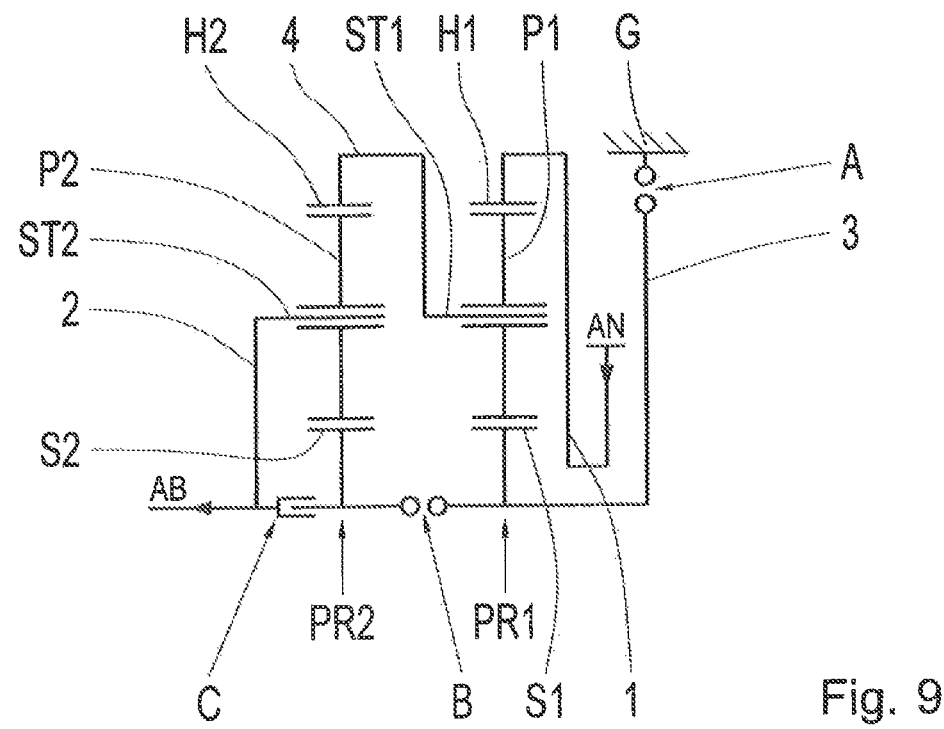
FIG. 9: A schematic view of a second embodiment of the transmission according to FIG. 8.
Figure 10:
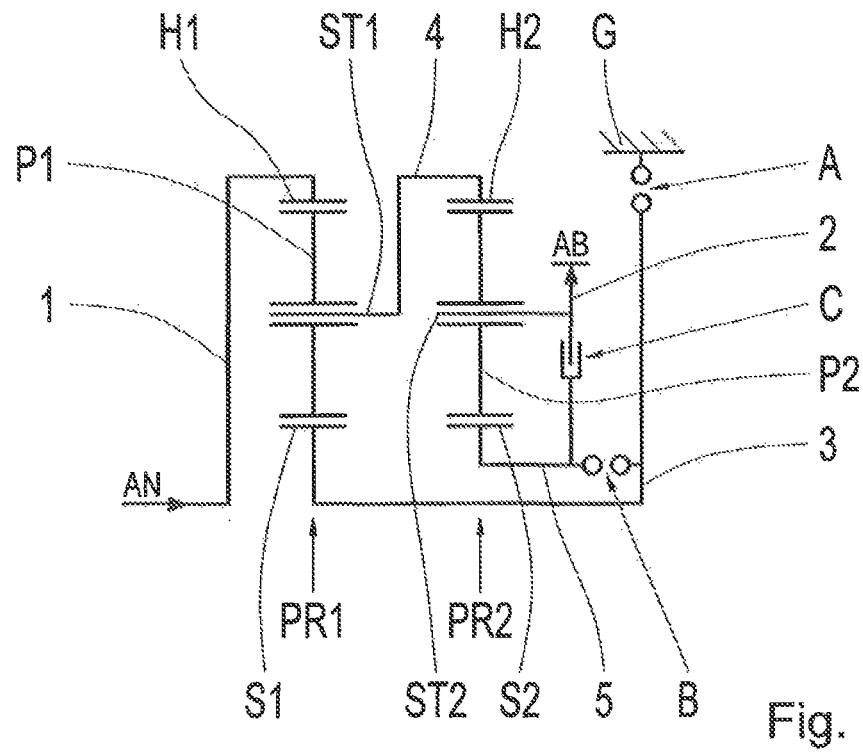
FIG. 10: A schematic view of a third embodiment of the transmission according to FIG. 8.

FIGS. 9 and 10 in each case show a further design form of the transmission described in FIG. 8, so that only the differences from the embodiment illustrated in FIG. 8 will be discussed.

In contrast to the embodiment described in FIG. 8, in the embodiment of the transmission according to the invention shown in FIG. 9 the transmission input and the transmission output are arranged at an angle to one another with the transmission input, viewed spatially, and axially in an area immediately adjacent to the first planetary gearset PR1 and the transmission output axially immediately adjacent to the second planetary gearset PR2. In this case the first planetary gearset PR1 is the gearset of the transmission nearest to the drive input and the second planetary gearset PR2 is the gearset of the transmission nearest to the drive output. FIG. 9 shows that the shifting element B, viewed spatially, is in an area between the two planetary gearsets PR1, PR2 and the shifting element C is arranged axially between the planetary gearset PR2 and the transmission output.

In contrast to the embodiment described in FIG. 8, in the embodiment of the transmission according to the invention shown in FIG. 10 the transmission input and the transmission output are arranged at an angle to one another and, viewed spatially, the transmission output is immediately adjacent to the second planetary gearset PR2. In this case the first planetary gearset PR1 is the gearset of the transmission nearest to the drive input and the second planetary gearset PR2 is the gearset of the transmission nearest to the drive output. FIG. 10 shows that as viewed in the axial direction, all three shifting elements A, B, C are arranged on the side of the second planetary gearset PR2 facing away from the first planetary gearset PR1.

Figure 11:
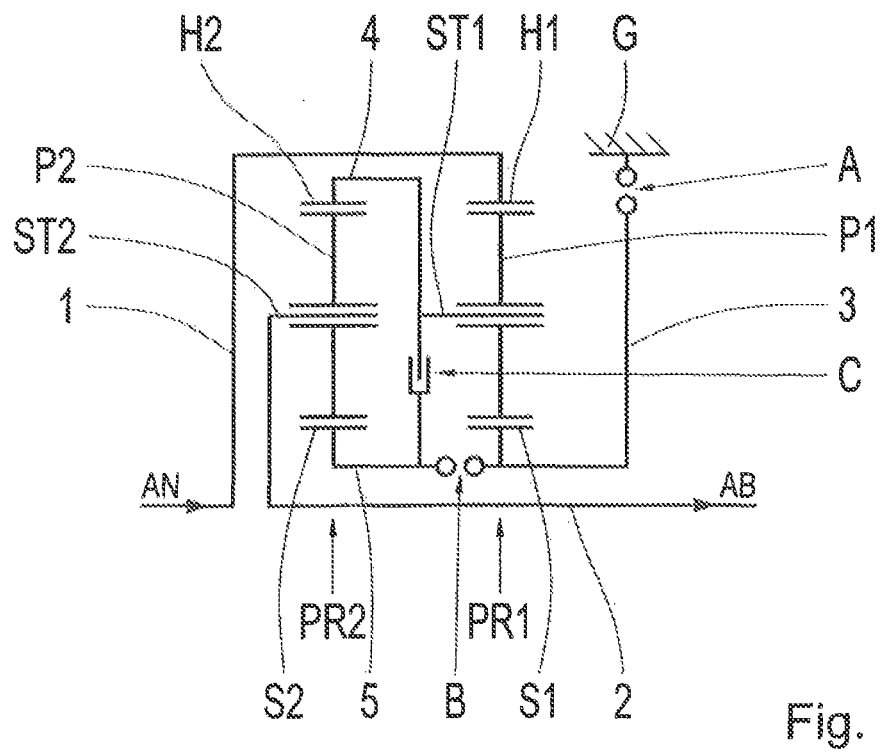
FIG. 11: A schematic view of a fourth embodiment of the transmission according to FIG. 8.

Starting from the consideration that in its engaged or closed condition the shifting element C locks the second planetary gearset PR2, in the following two example embodiments of a transmission according to the invention two other possibilities are shown for locking the second planetary gearset PR2 by means of the shifting element C. FIG. 11 shows a fourth example embodiment and FIG. 12 a fifth example embodiment, again in simplified schematic form, both of them based on the first example embodiment explained in detail earlier with reference to FIG. 8.

The transmission layout illustrated schematically in FIG. 11 differs from that shown in FIG. 8 mainly in that the shifting element C is now arranged in the force flow between the fourth shaft 4 and the fifth shaft 5. Thus, in its engaged or closed condition the shifting element C now connects the sun gear 82 and the ring gear H2 of the second planetary gearset PR2 to one another. A further difference from the transmission according to FIG. 8 consists in the spatial arrangement of the shifting element C and of the shifting element B. In the transmission according to FIG. 11 the shifting elements C and B, viewed spatially, are in an area axially between the first planetary gearset PR1 and the second planetary gearset PR2.

Figure 12:
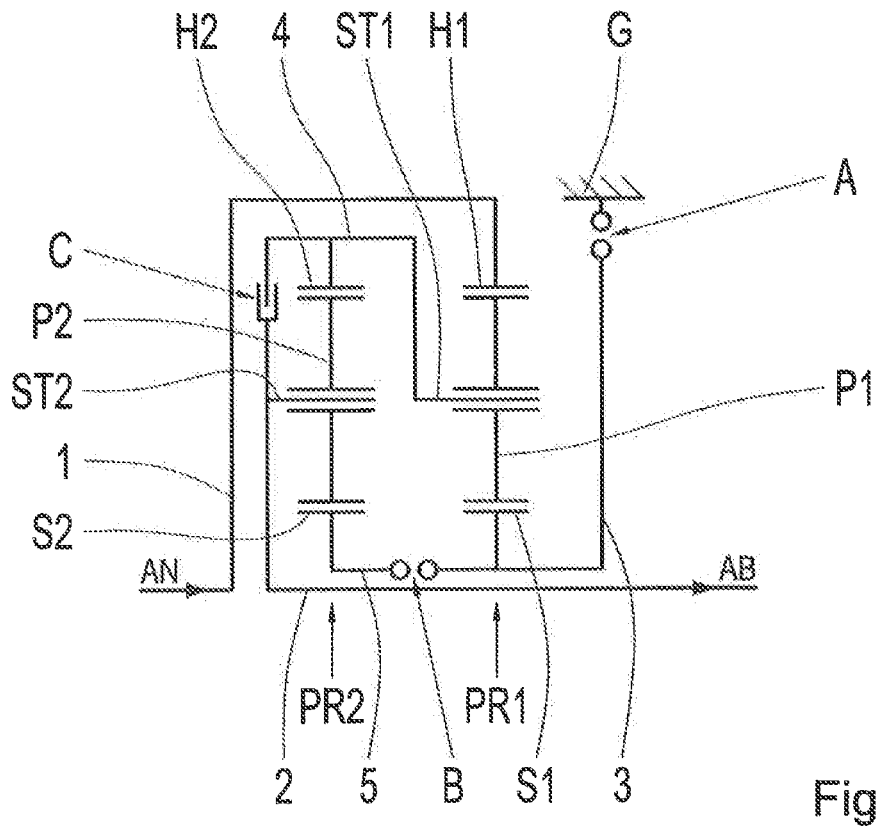
FIG. 12: A schematic view of a fifth embodiment of the transmission according to FIG. 8.

The transmission layout illustrated schematically in FIG. 12 differs from that shown in FIG. 8 mainly in that the shifting element C is now arranged in the force flow between the second shaft 2 and the fourth shaft 4. Thus, in its engaged or closed condition the shifting element C now connects the ring gear H2 and the carrier ST2 of the second planetary gearset PR2 to one another. A further difference from the transmission according to FIG. 8 consists in the spatial arrangement of the shifting elements C and B. In the transmission according to FIG. 12, as viewed spatially the shifting element C is in an area radially between the ring gear H2 and the carrier ST2 of the second planetary gearset PR2, axially immediately adjacent to the second planetary gearset PR2, while as viewed spatially, the shifting element B is arranged in an area axially between the first planetary gearset PR1 and the second planetary gearset PR2.

Thus, in accordance with the possible arrangements of the shifting element C described earlier, the second planetary gearset PR2 can be locked in three different, functionally equivalent ways.

Figure 13:
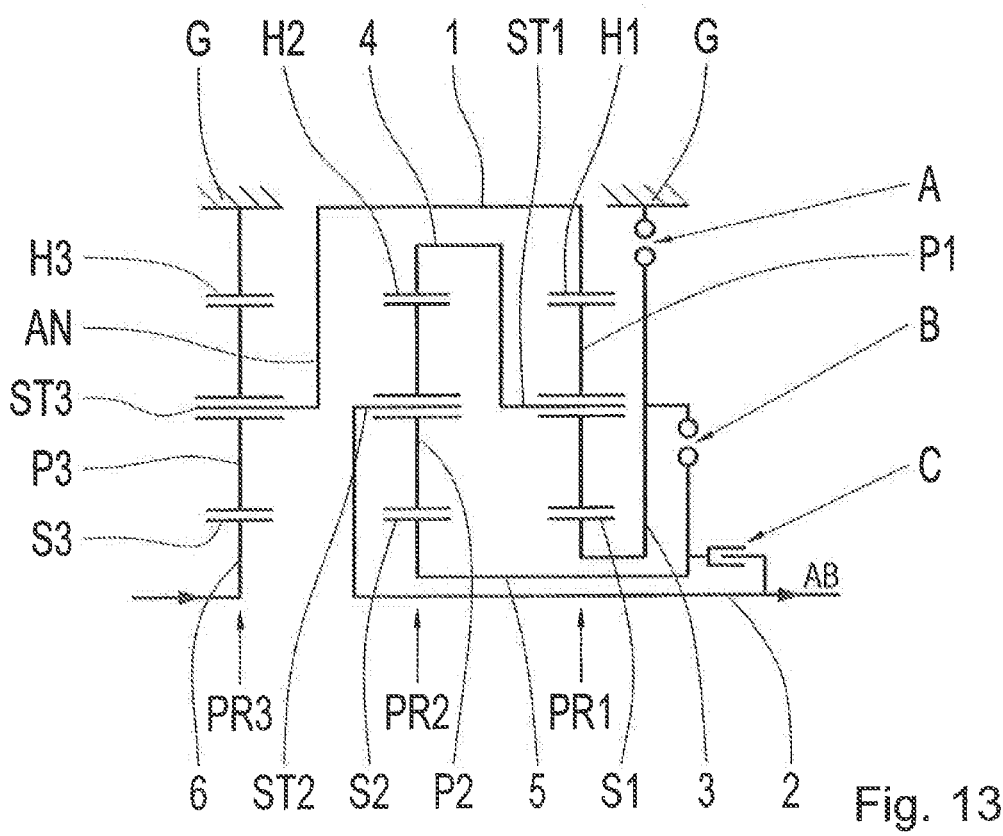
FIG. 13: A schematic view of a further embodiment of the transmission according to FIG. 8.

The transmission illustrated schematically in FIG. 13 differs from that shown in FIG. 8 mainly in that a planetary gearset PR3 is connected upstream from the transmission. This planetary gearset PR3 comprises a sun gear 33, a planetary gearwheel P3 and a ring gear H3. The sun gear 33 forms a sixth shaft 6, which is connected in a rotationally fixed or rotationally elastic manner to a drive output shaft of a drive aggregate (not shown here), for example an electric machine. The ring gear H3 is in the form of a rotationally fixed element and is in this case connected to the housing G of the transmission. A carrier ST3 of the planetary gearset PR3 is connected in a rotationally fixed manner to the drive input shaft AN of the downstream transmission and thus also to the ring gear H1 of the first planetary gearset PR1. By virtue of the upstream planetary gearset PR3, in this case designed as a minus planetary gearset, the drive torque of the drive aggregate can be increased.

FIG. 14 now shows in tabular form an example shifting scheme and example transmission ratios of the transmissions according to FIGS. 8 to 13. An X in the corresponding fields indicates which of the shifting elements A, B, C are closed in order to obtain the individual gears. The first gear can be obtained by closing the shifting elements A and B. The second gear can be obtained by closing the shifting elements A and C. The third gear can be obtained by closing the shifting elements B and C.

In addition, the table shows as examples the transmission of the respective gears, wherein the first gear has a transmission ratio of i=2.0, the second gear a transmission ratio of i=1.410 and the third gear a transmission ratio of i=1.0. Thus, the third gear can be designed as a so-termed direct gear. 'Transmission' and 'transmission ratio' have the same meaning here.

Furthermore, the table in FIG. 14 shows the corresponding gear intervals of the gears. A gear interval is understood to mean the quotient between the transmissions of a gear and that of a next-higher gear. In this case the gear interval from the first to the second gear has a value of ϕ=1.418 and the gear interval from the second to the third gear has a value of ϕ=1.410.

Figure 15:
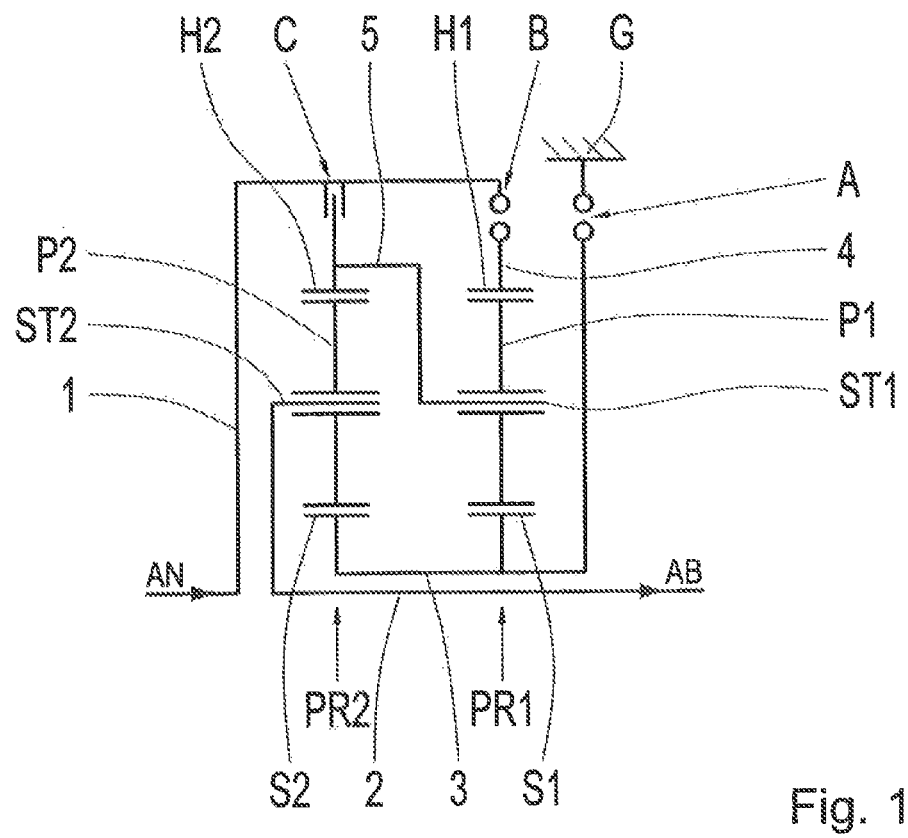
FIG. 15: A schematic view of a first embodiment of a transmission according to the third configuration of the invention.

FIG. 15 shows a schematic representation of a first embodiment of the transmission according to the invention, according to the third configuration of the invention. The transmission comprises a drive input shaft AN, a drive output shaft AB, a first planetary gearset PR1, a second planetary gearset PR2 and three shifting elements A, B, C, all accommodated in a housing G of the transmission. In this example embodiment both planetary gearsets PR1, PR2 are in the form of simple minus planetary gearsets. The ring gears of the two planetary gearsets PR1, PR2 are indexed H1 and H2, the sun gears S1 and 32, the planetary gearwheels P1 and P2 and the carriers, on which the planetary gearwheels P1, P2 are mounted to rotate, are indexed ST1 and ST2. The transmission has five rotary shafts, indexed 1 to 5.

With regard to the coupling of the individual elements of the two planetary gearsets PR1, PR2, to one another and to the drive input shaft AN and the drive output shaft AB, in the transmission according to this third configuration the provisions are as follows: the drive input shaft AN of the transmission forms the first rotary shaft of the transmission. A carrier ST2 of the second planetary gearset PR2 and the drive output shaft AB are connected to one another in a rotationally fixed manner and form the second rotary shaft 2 of the transmission. A sun gear S1 of the first planetary gearset PR1 and a sun gear 32 of the second planetary gearset PR2 are connected to one another in a rotationally fixed manner and form the third rotary shaft 3 of the transmission. A ring gear H1 of the first planetary gearset PR1 forms the fourth rotary shaft 4 of the transmission, and a carrier ST1 of the first planetary gearset PR1 and a ring gear H2 of the second planetary gearset PR2 are connected to one another in a rotationally fixed manner and form the fifth rotary shaft 5 of the transmission.

With regard to the coupling of the three shifting elements A, B, C to the shafts 1 to 5 of the transmission so described, in the transmission according to FIG. 15 the provisions are as follows: the shifting element A is arranged in the force flow between the third shaft 3 and the housing G of the transmission, the shifting element B is arranged in the force flow between the first shaft 1 and the fourth shaft 4, and the shifting element C is arranged in the force flow between the first shaft 1 and the fifth shaft 5.

In the example embodiment shown in FIG. 15 all three shifting elements A, B, C, as viewed spatially, are arranged in an area radially between the planetary gearsets PR1, PR2 and the housing G of the transmission. The two planetary gearsets PR1, PR2 are arranged coaxially one behind the other, the first planetary gearset PR1 being the gearset nearest the drive output of the transmission and the second planetary gearset PR2 being the gearset nearest the drive input of the transmission. The drive input shaft AN and the drive output shaft AB, as well as the transmission input and the transmission output, are also arranged coaxially with one another. The transmission input and the transmission output are on opposite sides of the transmission. However, the geometrical positions of the two planetary gets PR1, PR2 and the spatial arrangement of the shifting elements A, B, C can be chosen freely provided that they permit the connectability of the elements.

Figure 16:
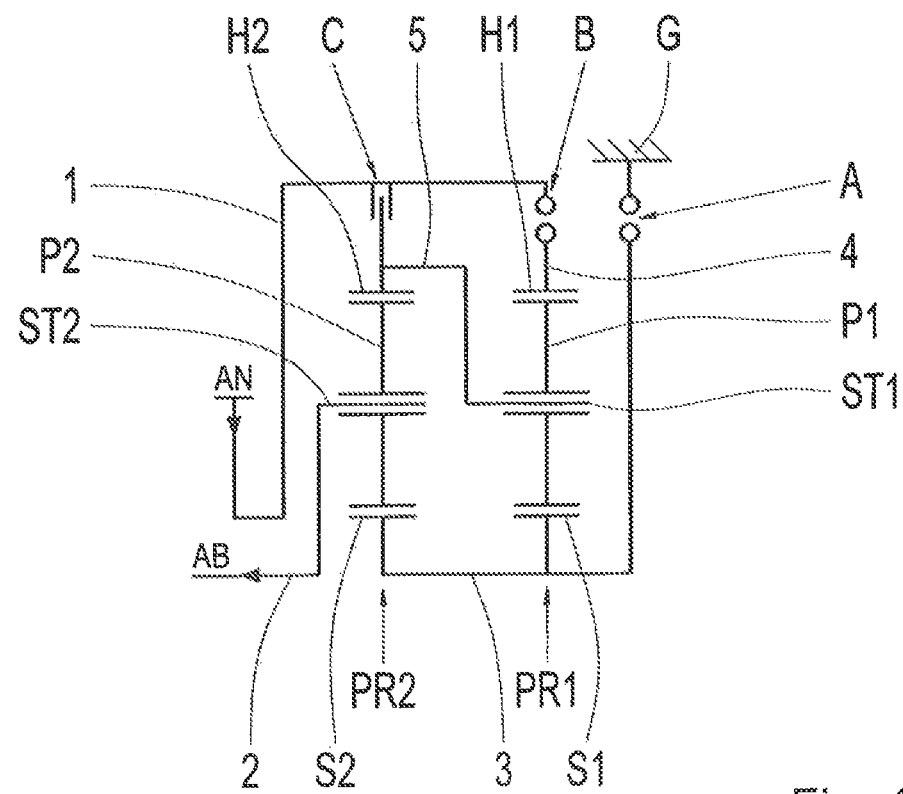
FIG. 16: A schematic view of a second embodiment of the transmission according to FIG. 15.
Figure 17:
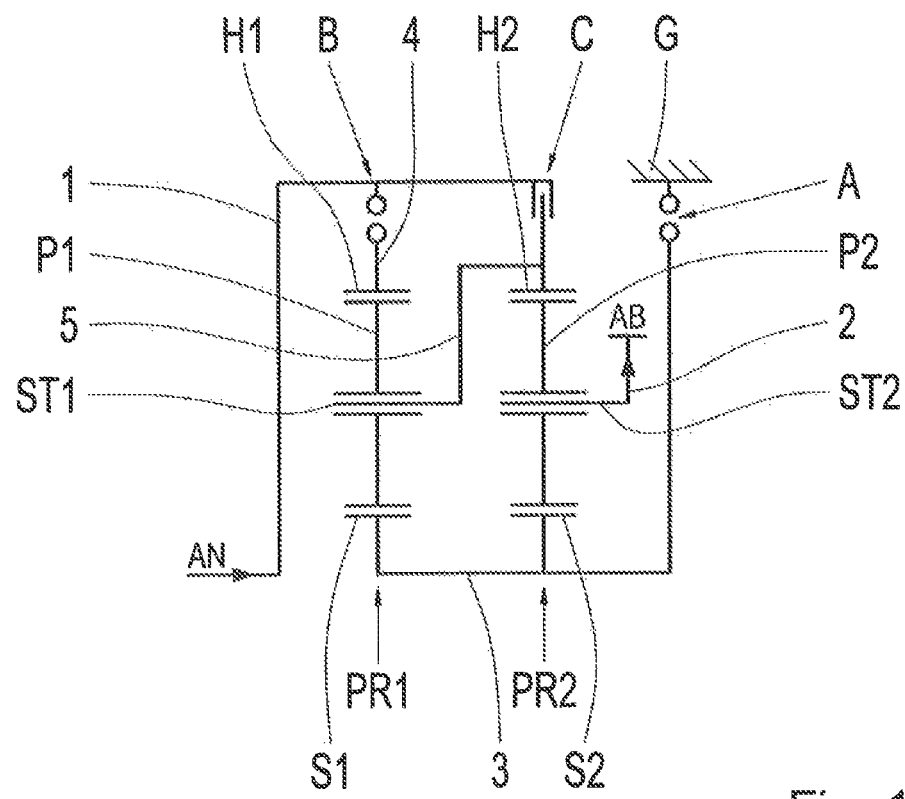
FIG. 17: A schematic view of a third embodiment of the transmission according to FIG. 15.

FIGS. 16 and 17 each show a further design form of the transmission described in FIG. 15, wherein only the differences from the embodiment described in FIG. 15 will be discussed. In contrast to the embodiment described in FIG. 15, in the embodiment of the transmission according to the invention shown in FIG. 16 the transmission input and the transmission output are arranged on the same side of the transmission housing and at an angle to one another, while in the embodiment of the transmission according to the invention shown in FIG. 17 the transmission input and the transmission output are arranged at an angle to one another and, as viewed spatially, the transmission output is positioned immediately adjacent to the second planetary gearset PR2. In this case the first planetary gearset PR1 is the gearset of the transmission nearest to the drive input and the second planetary gearset PR2 is the gearset of the transmission nearest to the drive output.

Figure 18:
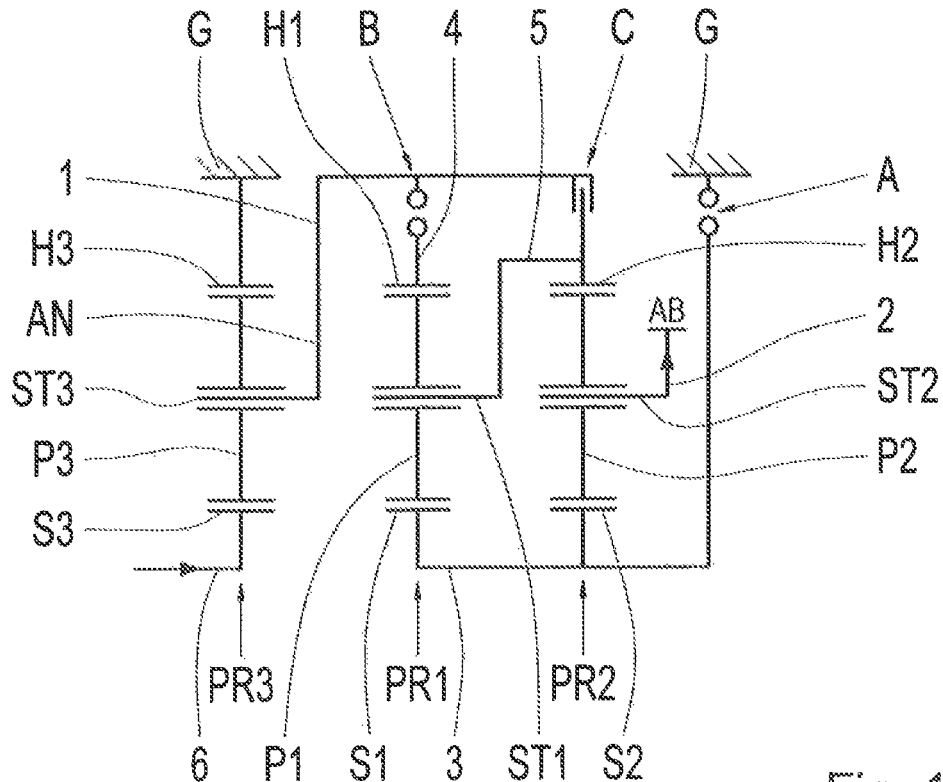
FIG. 18: A schematic view of a fourth embodiment of the transmission according to FIG. 15.

The transmission illustrated schematically in FIG. 18 differs from the transmission in FIG. 17 mainly in that a planetary gearset PR3 is connected upstream from the transmission. The planetary gearset PR3 comprises a sun gear S3, a planetary gearwheel P3 and a ring gear H3. The sun gear S3 forms a sixth shaft 6, which is or can be connected in a rotationally fixed or rotationally elastic manner to a drive output shaft of a drive aggregate (not shown here), for example an electric machine. The ring gear H3 is a rotationally fixed element and is in this case connected in a rotationally fixed manner to the housing G of the transmission. A carrier ST3 of the planetary gearset PR3 is connected in a rotationally fixed manner to the drive input shaft AN of the downstream transmission. By virtue of the upstream planetary gearset PR3, in this case in the form of a minus planetary gearset, the drive torque of the drive aggregate can be increased.

Figure 19:
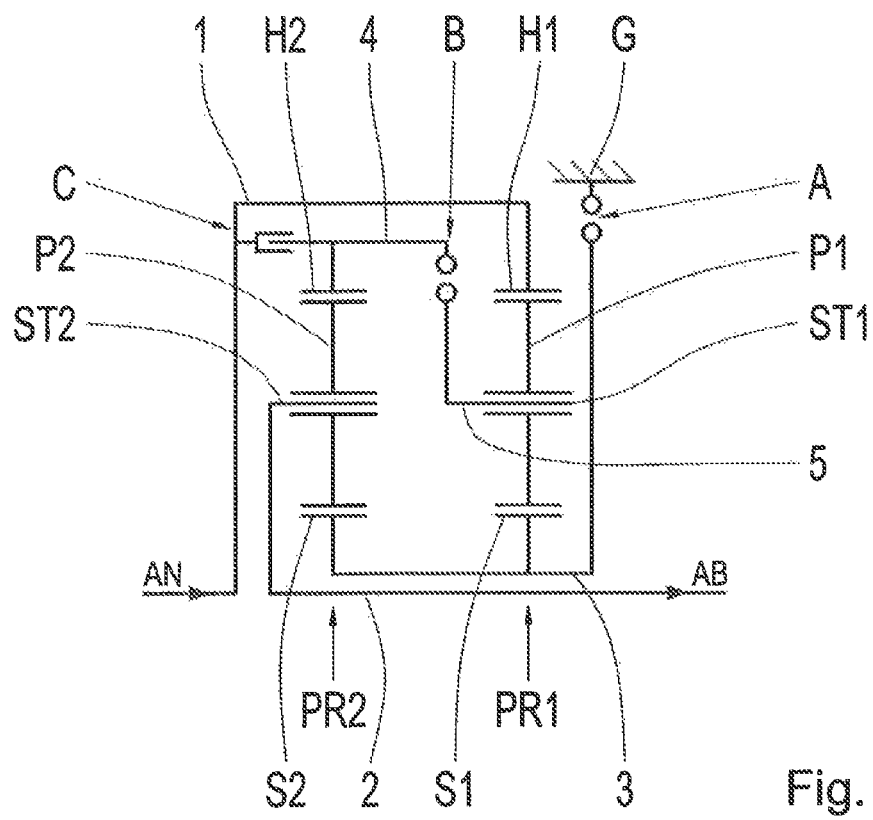
FIG. 19: A schematic view of a further embodiment of the transmission according to FIG. 15.

FIG. 19 shows a schematic representation of a further embodiment of the transmission according to the invention. In contrast to the embodiment described in FIG. 15, in the embodiment of the transmission according to the invention shown in FIG. 19 the drive input shaft AN of the transmission and the ring gear H1 of the first planetary gearset PR1 are connected in a rotationally fixed manner to one another and form the first rotary shaft 1 of the transmission. The ring gear H2 of the second planetary gearset PR2 forms the fourth rotary shaft 4 of the transmission, and the carrier ST1 of the first planetary gearset PR1 forms the fifth rotary shaft 5 of the transmission.

With regard to the coupling of the three shifting elements A, B, C to the shafts 1 to 5 of the transmission so described, in the transmission according to FIG. 19 the provisions are as follows: The shifting element A is arranged in the force flow between the third shaft 3 and the housing G of the transmission, the shifting element B is arranged in the force flow between the fourth shaft 4 and the fifth shaft 5 of the transmission, and the shifting element C is arranged in the force flow between the first shaft 1 and the fourth shaft 4. As viewed spatially, the shifting element B is arranged in the axial direction between the two planetary gearsets PR1, PR2.

Figure 20:
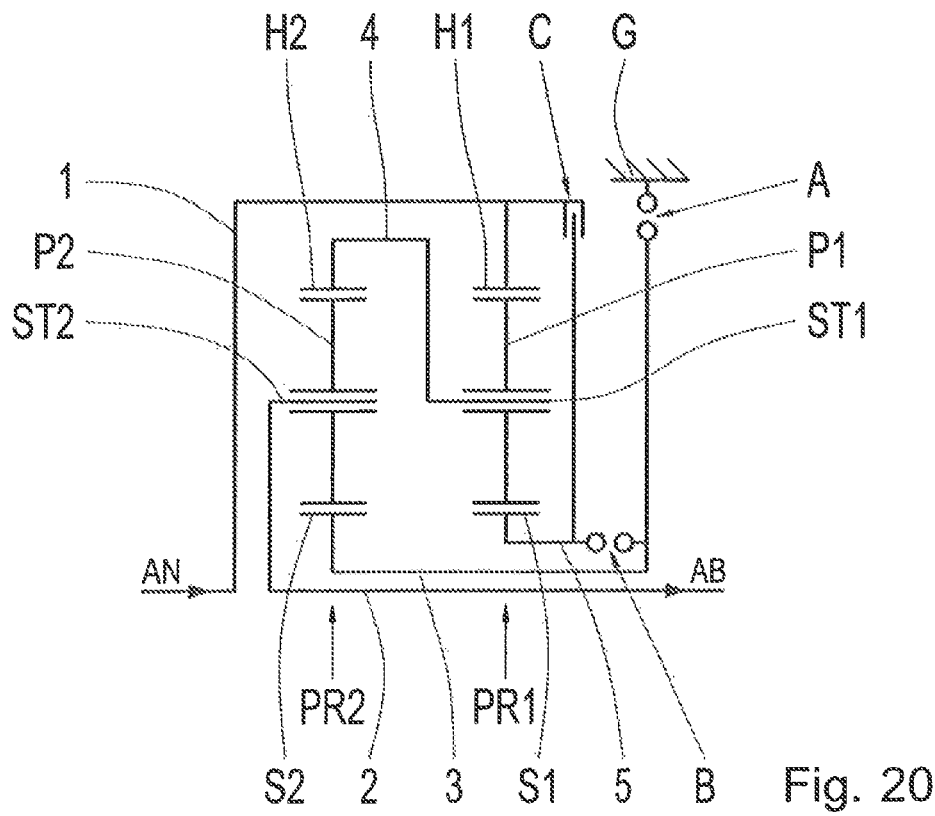
FIG. 20: A schematic view of a first embodiment of a transmission according to the fourth configuration of the invention.

FIG. 20 shows a schematic representation of a first embodiment of the transmission according to the invention in the fourth configuration according to the invention. The transmission comprises a drive input shaft AN, a drive output shaft AB, a first planetary gearset PR1, a second planetary gearset PR2 and three shifting elements A, B, C, all these accommodated in a housing G of the transmission. In this example embodiment the two planetary gearsets PR1 PR2 are in the form of simple minus planetary gearsets. The ring gears of the two planetary gearsets PR1, PR2 are indexed H1 and H2, their sun gears S1 and S2, their planetary gearwheels P1 and P2 and the carriers, on which the planetary gearwheels P1, P2 are mounted to rotate, are indexed ST1 and ST2, respectively.

With regard to the coupling of the individual elements of the two planetary gearsets PR1, PR2 to one another and to the drive input and drive output shafts AN, AB, in the transmission according to this fourth configuration according to the invention, the provisions are as follows: the drive input shaft AN of the transmission is connected in a rotationally fixed manner to the ring gear H1 of the first planetary gearset PR1, forming the first rotary shaft 1 of the transmission. The carrier ST2 of the second planetary gearset PR2 and the drive output shaft AB are connected to one another in a rotationally fixed manner and form the second rotary shaft 2 of the transmission. A sun gear 32 of the second planetary gearset PR2 forms the third rotary shaft 3 of the transmission. A carrier ST1 of the first planetary gearset PR1 and a ring gear H2 of the second planetary gearset PR2 are connected to one another in a rotationally fixed manner and form the fourth rotary shaft 4 of the transmission, and a sun gear S1 of the first planetary gearset PR1 forms the fifth rotary shaft 5 of the transmission.

With regard to the coupling of the three shifting elements A, B, C to the shafts 1 to 5 of the transmission so described, in the transmission according to FIG. 20, the provisions are as follows: the shifting element A is arranged in the force flow between the third shaft 3 and the housing G of the transmission, the shifting element B is arranged in the force flow between the third shaft 3 and the fifth shaft 5, and the shifting element C is arranged in the force flow between the first shaft 1 and the fifth shaft 5.

In the example embodiment shown in FIG. 20 the two planetary gearsets PR1, PR2 are arranged coaxially one behind the other, the first planetary gearset PR1 being the gearset of the transmission that is nearest to the drive output, while the second planetary gearset PR2 is the gearset of the transmission that is nearest to the drive input. The drive input shaft AN and the drive output shaft AB as well as the transmission input and the transmission output are also arranged coaxially with one another in such manner that the drive input shaft AN extends completely over the planetary gearsets PR1, PR2 in the axial direction. The transmission input and the transmission output are on opposite sides of the transmission. In FIG. 20, as viewed in the axial direction all three of the shifting elements A, B, C are arranged on the side of the first planetary gearset PR1 that faces away from the second planetary gearset PR2. However, the geometrical positions of the two planetary gearsets PR1 PR2 and the spatial arrangement of the shifting elements A, B, C can be chosen freely provided that they permit the connectability of the elements.

Figure 21:
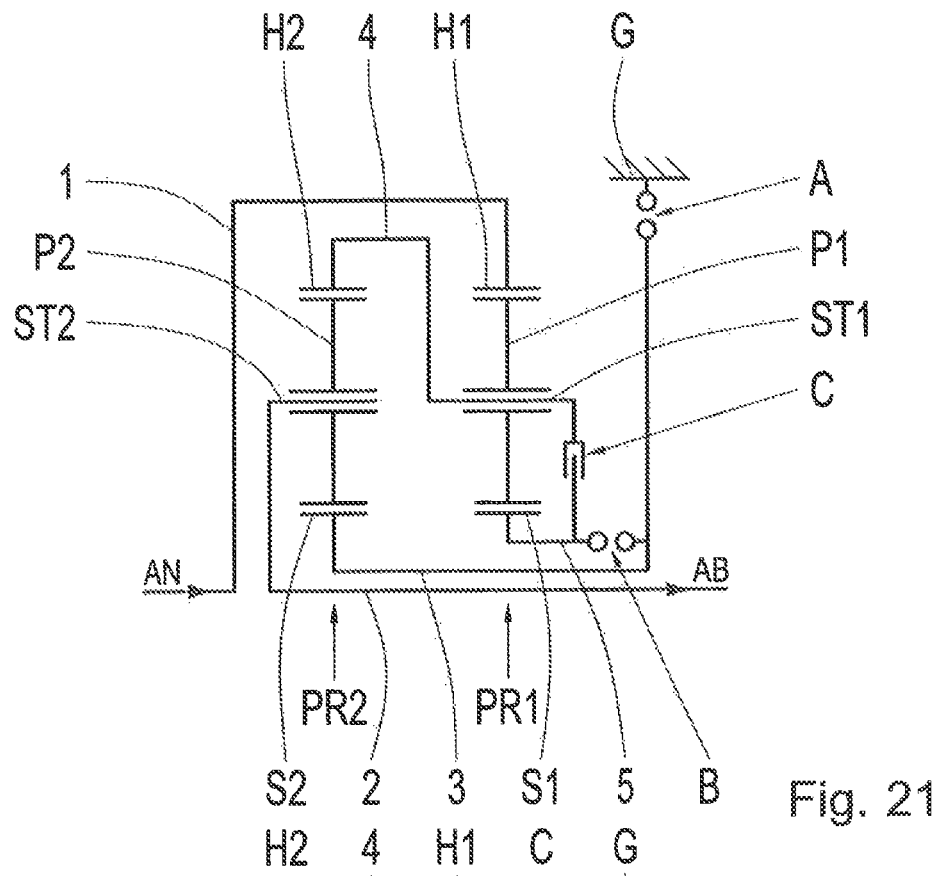
FIG. 21: A schematic view of a second embodiment of the transmission according to FIG. 20.

Starting from the consideration that in its engaged or closed condition the shifting element C locks the first planetary gearset PR1, in the following two example embodiments of a transmission according to the invention two other possibilities are indicated for locking the first planetary gearset PR1 by means of the shifting element C. FIG. 21 shows a second example embodiment and FIG. 22 a third example embodiment, again represented in simplified schematic form, both of them based on the first example embodiment previously explained in detail with reference to FIG. 20.

The transmission layout illustrated schematically in FIG. 21 differs from the transmission layout in FIG. 20 mainly in that the shifting element C is now arranged in the force flow between the fourth shaft 4 and the fifth shaft 5. In its engaged or closed condition the shifting element C therefore now connects the carrier ST1 and the sun gear S1 of the first planetary gearset PR1 to one another.

Figure 22:
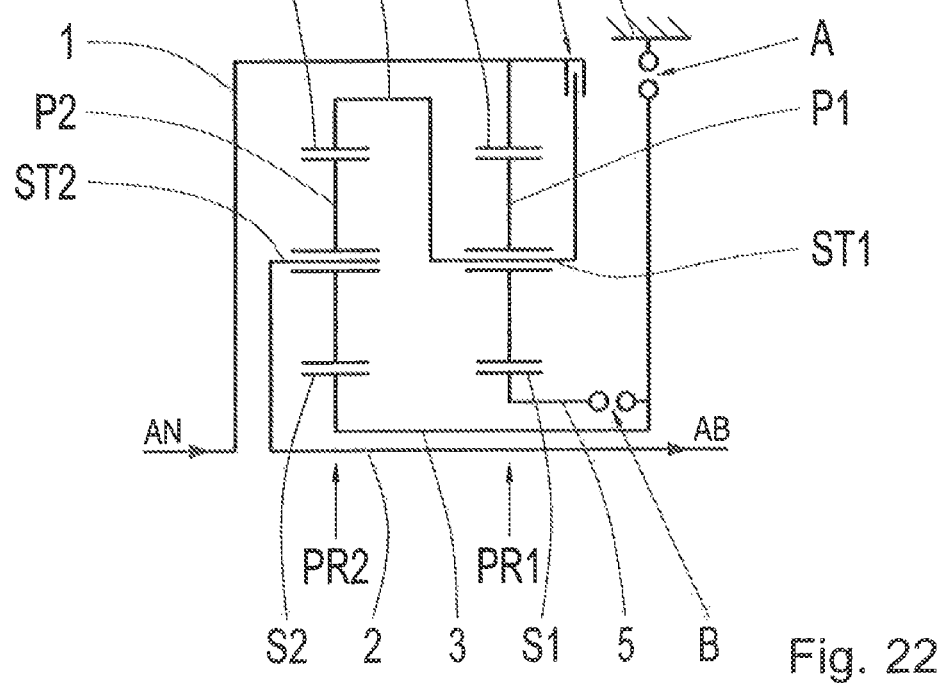
FIG. 22: A schematic view of a third embodiment of the transmission according to FIG. 20.

The transmission layout illustrated schematically in FIG. 22 differs from the transmission layout in FIG. 20 mainly in that the shifting element C is now arranged in the force flow between the first shaft 1 and the fourth shaft 4. In its engaged or closed condition the shifting element C therefore now connects the ring gear H1 and the carrier ST1 of the first planetary gearset PR1 to one another.

Thus, depending on the above-described possible arrangements of the shifting element C, the first planetary gearset PR1 can be locked in three different, functionally equivalent ways.

Figures 23, 24:
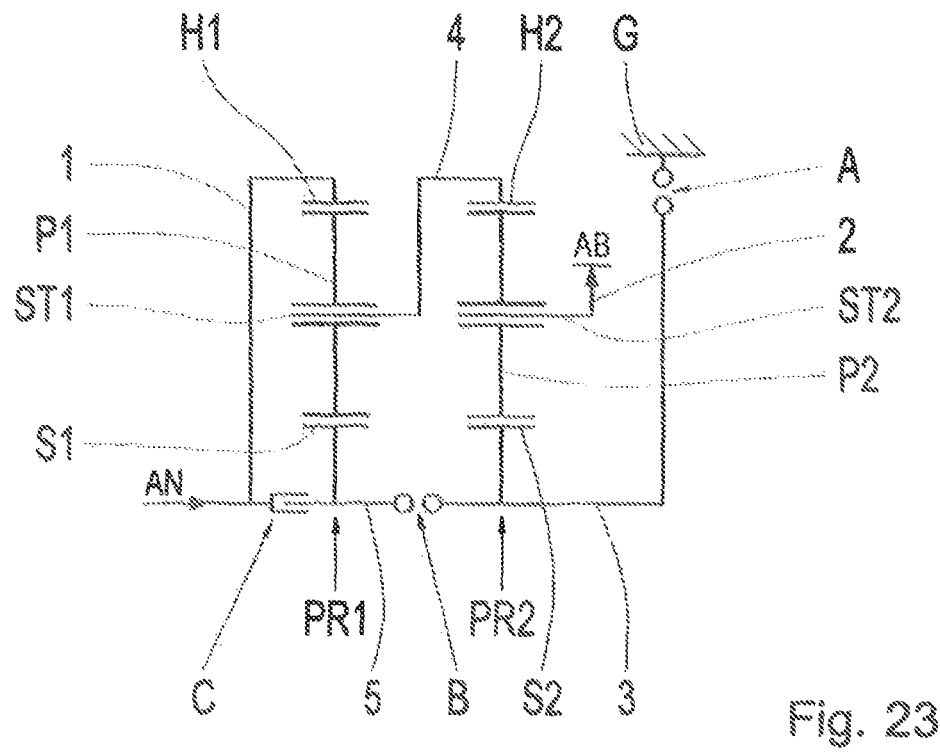
FIG. 23: A schematic view of a fourth embodiment of the transmission according to FIG. 20.
FIG. 24: An example shifting scheme for the transmission according to the third and the fourth configurations of the invention.

FIG. 23 shows a further design version of the transmission described in FIG. 20, wherein only the differences from the embodiment described in FIG. 20 will be discussed.

In contrast to the embodiment described in FIG. 20, in the embodiment of the transmission according to the invention shown in FIG. 23, the transmission input and the transmission output are arranged at an angle to one another and, viewed spatially, the transmission output is arranged immediately adjacent to the second planetary gearset PR2. In this case the first planetary gearset PR1 is the gearset of the transmission nearest to the drive input of the transmission and the second planetary gearset PR2 is the gearset of the transmission nearest to the drive output of the transmission. According to FIG. 23 the shifting element B, viewed spatially, is arranged in an area between the two planetary gearsets PR1, PR2 and the shifting element C is arranged axially between the planetary gearset PR1 and the transmission input.

FIG. 24 shows in tabular form an example shifting scheme for the transmissions according to the third and fourth configurations of the invention, i.e. according to FIGS. 15 to 23. An X in any field indicated which of the shifting elements A, B, C are closed for obtaining the individual gears. The first gear can be obtained by closing the shifting elements A and B. The second gear can be obtained by closing the shifting elements A and C, and the third gear can be obtained by closing the shifting elements B and C.

In addition the table also indicates as examples the transmissions of the respective gears, the first gear having a transmission ratio of i=2.022, the second gear a transmission ratio of i=1.413 and the third gear a transmission ratio of i=1.0. Thus, the third gear can also be designed as a so-termed direct gear. Here, 'transmission' and 'transmission ratio' have the same meaning.

Furthermore, from the table in FIG. 24 the corresponding gear intervals can be seen. A gear interval is understood to mean the quotient between the transmission ratio of a gear and that of a next-higher gear. In this case the gear interval from the first to the second gear has a value of φ=1.417 and the gear interval from the second to the third gear a value of φ=1.413.

Below, further features of the present invention will be described, all of which apply in equal measure to the five proposed configurations according to the invention and their embodiments.

According to FIGS. 1 to 24 the shifting elements A, B, C are designed as follows: the shifting element A, namely the first shifting element, is in the form of a first brake, the shifting element B, namely the second shifting element, is in the form of a first clutch and the shifting element C, namely the third shifting element, is in the form of a second clutch. In the example embodiments illustrated, the first brake A is an interlocking brake, the first clutch is an interlocking clutch and the second clutch C is a frictional clutch. With these three shifting elements A, B, C, three gears can be engaged selectively.

By virtue of such a design of the shifting elements A, B, C, the structural complexity of the shifting elements can be corresponding reduced as compared with an embodiment in which all the shifting elements A, B, C are frictional. A traction upshift from the first to the second gear or a traction downshift from the second to the first gear can advantageously be carried out as powershifts, since the clutch C to be closed or opened respectively during the gearshift is a friction clutch.

Whereas the first gear of the transmission is mainly needed for starting, the second gear and the third gear can constitute the main driving gears of the transmission. Since by virtue of such a design of the shifting elements the only frictional shifting element, namely the clutch C, is closed in the second and third gears, in these main driving gears of the transmission no drag losses occur due to the frictional shifting element.

The transmission ratios of the first and second gears can preferably be chosen such that they cover the full speed range of the vehicle, whereby a gearshift from the first to the second gear as a traction upshift or from the second to the first gear as a traction downshift during working performance operation can always be carried out as powershifts. The third gear is then designed as a so-termed overdrive gear by virtue of which, at higher speeds in the third gear, the rotational speeds are lower. This improves the efficiency and reduces the noise level.

Depending on the rotational direction of the drive input shaft of the transmission, the first, second and third gears of the transmission according to the invention can be used as forward gears or as reverse gears. Thus, with a first rotational direction of the drive input shaft, the gears of the transmission can be used as forward gears, whereas when the drive input shaft rotates in a second direction opposite to the first rotational direction, the gears of the transmission can be used as reverse gears. The shifting elements A, B, C and their shifting conditions are identical for the forward and reverse gears, so that no separate transmission components are needed for the reverse gears.

Below, for an electric vehicle or a hybrid vehicle constructed with a transmission according to the invention as described earlier, examples of various gearshifts are described with regard to the shift types of traction upshift, traction downshift, overdrive upshift and overdrive downshift, on the assumption that only the clutch C is a frictional shifting element while the other two shifting elements A and B are interlocking shifting elements.

As already mentioned a traction upshift, i.e. an upshift while the engine torque is positive, from the first to the second gear can be carried out as a powershift since the clutch C that has to be closed for the gearshift from first to second gear is a friction clutch. During the traction upshift from the first to the second gear, by closing the friction clutch C a rotational speed difference is produced, whereby a load transfer by way of the friction clutch C can take place so that the interlocking clutch B to be opened during the gearshift can be disengaged while free from load. Then rotational speed adaptation takes place to the new second gear and the friction clutch C to be closed during the change from the first to the second gear is fully closed. Thus, the traction upshift from first to second, which occurs frequently during driving operation, can be carried out as a powershift.

A traction upshift from the second to the third gear is carried out as a traction force interrupting shift since the clutch B to be closed during the gearshift from second to third gear is an interlocking shifting element so that there can be no load uptake by the clutch B when there is a rotational speed difference. In this case a traction force interrupting shift is acceptable, since this preferably occurs at already higher speeds, when the traction force is therefore lower.

A traction downshift, i.e. a downshift while the engine torque is positive, from the second to the first gear, can be carried out as a powershift since the clutch C to be opened during the gearshift from second to first gear is a frictional clutch. During the traction downshift from second to first gear a rotational speed difference is produced at the frictional clutch C being opened, whereby at first a load can be partially maintained by the frictional clutch C so that once the speed adaptation has taken place, the interlocking clutch B to be closed during the gearshift can be engaged while free from load. Then, the clutch C to be opened is fully opened and the already engaged clutch B takes up the load. The ability to carry out the downshift from the second to the first gear as a powershift is very advantageous since at low driving speeds the traction force can be increased, as for example when an electric machine arranged on the transmission input is operated at a rotational speed lower than its so-termed transition speed and cannot bring its full power to bear.

A traction downshift from the third to the second gear is carried out as a traction force interrupting shift, since the clutch B to be opened during the gearshift from the third to the second gear is an interlocking clutch so that it cannot maintain any load when there is a speed difference. A traction force interrupting shift is acceptable in this case since it preferably only takes place at higher driving speeds and when the vehicle is slowing down. During a downshift from the third to the second gear a vehicle driver as a rule only requires little propulsion power so that not much traction force is called for. When driving with an electric machine as the drive aggregate, above the so-termed transition speed the full drive power is always available. Thus, even if the vehicle is slowing down because of an uphill slope, the full drive power is available so long as the rotational speed of the electric machine does not fall below the so-termed transition speed.

An overdrive downshift, i.e. a downshift while the engine torque is negative, from the third to the second gear is carried out as a traction force interrupting shift, since the brake A to be closed during the gearshift from the third to the second gear is an interlocking shifting element and cannot therefore take up any load when there is a rotational speed difference. The ability to carry out an overdrive downshift from third to second gear as a powershift would however be advantageous, since during electrical braking, i.e. during recuperation, the vehicle slows down and by virtue of an overdrive downshift the electric machine could again be operated at a higher rotational speed. The overdrive downshift from the third to the second gear prevents the rotational speed of the electric machine from falling below the so-termed transition speed at which the electric machine can no longer deliver its full power, whereby the electric machine is operated with better efficiency. If the transmission ratios of the first and second gears are chosen such that they cover the full speed range of the vehicle, and if the third gear is designed as a so-termed overdrive gear, then in a preferred design version the traction force interrupting shift from the third to the second gear is carried out when the driver's requirements call for a change from traction operation to overdrive operation. The traction force interrupting downshift from the third to the second gear can be masked in the load change from traction to overdrive operation, whereby the driving comfort is correspondingly improved.

An overdrive downshift from the second to the first gear is carried out as a traction force interrupting shift, since the clutch B to be closed during the gearshift from the second to the first gear is an interlocking shifting element and no load transfer can therefore take place by the clutch B when there is a rotational speed difference. In this case a traction force interrupting shift is acceptable since during electrical braking, i.e. recuperation, at that shifting point the vehicle becomes very slow and for reasons of comfort the full power of the electric machine can in any case not be called for.

An overdrive upshift, i.e. an upshift while the engine torque is negative, from the first to the second gear is carried out as a traction force interrupting shift, since the clutch B to be opened during the gearshift from the first to the second gear is an interlocking shifting element, so that it cannot maintain any load if there is a speed difference. A traction force interrupting shift is acceptable in this case, since overdrive upshifts from first to second gear occur rather seldom in practice, for example when the vehicle is accelerating downhill despite the thrust torque.

An overdrive upshift from the second to the third gear is carried out as a traction force interrupting shift, since the brake A to be opened during the gearshift from the second to the third gear is an interlocking shifting element and cannot therefore maintain any load if there is a speed difference. A traction force interrupting shift is acceptable in this case, since overdrive upshifts from second to third gear occur rather seldom in practice, for example when the vehicle is accelerating downhill despite the thrust torque.

Below, as an example a possible shift sequence is described. In the initial situation the transmission is in the first gear and the vehicle is accelerated by its drive aggregate because of a driver's demand for that. If the vehicle has reached a specific speed or if the drive input shaft of the transmission is rotating at a specific rotational speed, then a traction upshift takes place from the first to the second gear, which as already mentioned above, can be carried out as a powershift. In the second gear the vehicle is accelerated further by its drive aggregate. If the vehicle has reached a second specific speed or if the drive input shaft of the transmission is rotating at a second specific rotational speed, then a traction upshift takes place from the second to the third gear, which as already mentioned above, is carried out as a traction force interrupting shift. In the third gear the vehicle can be accelerated further by its drive aggregate. Thereafter, if the vehicle is braked for example because the driver has actuated the brake pedal, the vehicle decelerates and recuperation takes place. A traction force interrupted downshift from the third to the second gear is then triggered when the vehicle reaches a third specific speed or the drive input shaft of the transmission is rotating at a third specific rotational speed. As already mentioned above, this downshift can be carried out when the driver's requirements call for a change from traction operation to overdrive operation. If the vehicle decelerates further, then the now engaged second gear can preferably remain engaged down to a vehicle speed of almost zero. If the driver again calls for increased drive power, for example by actuating an accelerator pedal, then a traction downshift takes place from the second to the first gear, which as already mentioned above, can be carried out as a powershift. Then the vehicle can be accelerated again in the first gear.

INDEXES

AN Drive input shaft
AB Drive output shaft
1 First shaft
2 Second shaft
3 Third shaft
4 Fourth shaft
5 Fifth shaft
6 Sixth shaft
A First shifting element, first brake
B Second shifting element, first clutch
C Third shifting element, second clutch
G Housing
PR1 First planetary gearset
PR2 Second planetary gearset
PR3 Third planetary gearset
S1 Sun gear of the first planetary gearset
S2 Sun gear of the second planetary gearset
S3 Sun gear of the third planetary gearset
P1 Planetary gearwheel of the first planetary gearset
P2 Planetary gearwheel of the second planetary gearset
P3 Planetary gearwheel of the third planetary gearset
H1 Ring gear of the first planetary gearset
H2 Ring gear of the second planetary gearset
H3 Ring gear of the third planetary gearset
ST1 Carrier of the first planetary gearset
ST2 Carrier of the second planetary gearset
ST3 Carrier of the third planetary gearset.

The invention claimed is:

1. A transmission comprising:
   a drive input shaft (AN),
   a drive output shaft (AB),
   a housing (G),
   at least first and second planetary gearsets (PR1, PR2), and each of the at least first and second planetary gearset comprising a sun gear, a carrier and a ring gear,
   at least first, second and third shifting elements (A, B, C), and selective engagement of the at least first, second and third shifting elements (A, B, C) producing various transmission ratios between the drive input shaft (AN) and the drive output shaft (AB) so that at least first, second and third gears are implementable,
   the drive input shaft (AN) and the ring gear (H1) of the first planetary gearset (PR1) being directly connected to one another in a rotationally fixed manner for forming a first shaft (1),
   the drive output shaft (AB) and the carrier (ST1) of the first planetary gearset (PR1) being directly connected to one another in a rotationally fixed manner for forming a second shaft (2),
   the carrier (ST2) of the second planetary gearset (PR2) forming a third shaft (3),
   the ring gear (H2) of the second planetary gearset (PR2) forming a fourth shaft (4),
   the sun gear (S1) of the first planetary gearset (PR1) and the sun gear (S2) of the second planetary gearset (PR2) both being directly connected to one another in a rotationally fixed manner for forming a fifth shaft (5),
   the first shifting element (A) being arranged in a force flow between the third shaft (3) and the housing (G) of the transmission,
   the second shifting element (B) being arranged in a force flow between the second shaft (2) and the fourth shaft (4), and
   the third shifting element (C) being arranged in a force flow between either:
      the third shaft (3) and the fourth shaft (4);
      the fourth shaft (4) and the fifth shaft (5); or
      the third shaft (3) and the fifth shaft (5).

2. The transmission according to claim 1, wherein a first gear is implemented by engagement of the first and the second shifting elements (A, B),
   a second gear is implemented by engagement of the first and the third shifting elements (A, C), and
   a third gear is implemented by engagement of the second and the third shifting elements (B, C).

3. The transmission according to claim 1, wherein the first, the second and the third shifting elements (A, B, C) are each frictional shifting elements.

4. The transmission according to claim 1, wherein the first shifting element (A) and the second shifting element (B) are each interlocking shifting elements and the third shifting element (C) is a frictional shifting element.

5. The transmission according to claim 1, wherein a third planetary gearset (PR3) is connected upstream of the transmission, and a sun gear (S3) of the third planetary gearset (PR3) forms a sixth shaft (6) of the transmission, a ring gear (H3) of the third planetary gearset (PR3) is a rotationally fixed element, and a carrier (ST3) of the third planetary gearset (PR3) is connected in a rotationally fixed manner to the first shaft (1) of the downstream transmission so that the drive input shaft (AN) and the ring gear (H1) of the first planetary gearset (PR1) are directly connected to one another through the carrier (ST3) of the third planetary gearset (PR3) and the first shaft.

6. The transmission according to claim 1, wherein the transmission is a main transmission of a group transmission which comprises at least one of:
   at least one upstream group in driving connection with the main transmission and located upstream thereof, and
   at least one downstream group in driving connection with the main transmission and located downstream thereof.

7. A method for operating a transmission comprising a drive input shaft (AN), a drive output shaft (AB), a housing (G), at least first and second planetary gearsets (PR1, PR2), each of the at least first and second planetary gearset comprises a sun gear, a carrier and a ring gear, and at least first, second and third shifting elements (A, B, C) whose selective engagement produces various transmission ratios between the drive input shaft (AN) and the drive output shaft (AB), so that at least first, second and third gears are implementable; the ring gear (H1) of the first planetary gearset (PR1) and the drive input shaft (AN) are connected to one another in a rotationally fixed manner for forming a first shaft (1), the carrier (ST1) of the first planetary gearset (PR1) and the drive output shaft (AB) are connected to one another in a rotationally fixed manner for forming a second shaft (2), the carrier (ST2) of the second planetary gearset (PR2) forms a third shaft (3), the ring gear (H2) of the second planetary gearset (PR2) forms a fourth shaft (4), the sun gear (S1) of the first planetary gearset (PR1) and the sun gear (S2) of the second planetary gearset (PR2) are connected to one another in a rotationally fixed manner for forming a fifth shaft (5), the first shifting element (A) is arranged in a force flow between the third shaft (3) and the housing (G) of the transmission, the second shifting element (B) is arranged in a force flow between the second shaft (2) and the fourth shaft (4), and the third shifting element (C) is arranged in a force flow between either the third shaft (3) and the fourth shaft (4), the fourth shaft (4) and the fifth shaft (5), or the third shaft (3) and the fifth shaft (5), the method comprising the step of:
   implementing each of the first, the second and the third gears by engaging two of the first, the second and the third shifting elements and disengaging the other of the first, the second and the third shifting elements.

8. The method according to claim 7, further comprising the step of implementing a gearshift from one gear to either an adjacent higher gear or an adjacent lower gear by engaging the disengaged one of the shifting elements and by disengaging one of the two engaged shifting elements.

9. The method according to claim 7, further comprising the step of implementing at least a traction upshift from the first gear to the second gear and also a traction downshift from the second gear to the first gear as powershifts.

10. The method according to claim 7, further comprising the step of implementing an overdrive downshift from the third gear to the second gear, which is a traction force interrupting shift, when a requirement of the drive calls for a change from traction operation to overdrive operation.

11. The transmission according to claim 1, in combination with a drive-train for a motor vehicle which comprises a drive aggregate, the drive input shaft (AN) of the transmission is either connected or connectable to the drive output shaft of the drive aggregate in either a rotationally fixed or a rotationally elastic manner.

12. The transmission according to claim 11, wherein the drive aggregate is an electric machine, and depending on a rotational direction of the electric machine the first gear, the second gear and the third gear are obtainable as either forward gears or reverse gears.

13. The transmission according to claim 12, wherein the drive-train is a hybrid drive-train and comprises an internal combustion engine.

* * * * *